(12) United States Patent
Suchansky et al.

(10) Patent No.: US 11,231,190 B2
(45) Date of Patent: Jan. 25, 2022

(54) FILTER CLEANING DEVICE FOR AN AIR CONDITIONER AND AIR CONDITIONER HAVING SUCH FILTER CLEANING DEVICE

(71) Applicants: DAIKIN INDUSTRIES, LTD., Osaka (JP); DAIKIN EUROPE N.V., Ostend (BE)

(72) Inventors: Ivan Suchansky, Mladá Boleslav (CZ); Ludek Vyvoda, Plzen (CZ)

(73) Assignees: DAIKIN INDUSTRIES, LTD., Osaka (JP); DAIKIN EUROPE N.V., Ostend (BE)

( * ) Notice: Subject to any disclaimer, the term of this patent is extended or adjusted under 35 U.S.C. 154(b) by 364 days.

(21) Appl. No.: 16/321,084

(22) PCT Filed: Jul. 25, 2017

(86) PCT No.: PCT/JP2017/026852
§ 371 (c)(1),
(2) Date: Jan. 28, 2019

(87) PCT Pub. No.: WO2018/021304
PCT Pub. Date: Feb. 1, 2018

(65) Prior Publication Data
US 2019/0170377 A1     Jun. 6, 2019

(30) Foreign Application Priority Data

Jul. 28, 2016   (EP) ..................................... 16181791

(51) Int. Cl.
*B01D 46/00* (2006.01)
*F24F 8/10* (2021.01)
(Continued)

(52) U.S. Cl.
CPC ............. *F24F 8/10* (2021.01); *B01D 46/0065* (2013.01); *F24F 13/28* (2013.01); *F24F 8/90* (2021.01); *F24F 2221/22* (2013.01)

(58) Field of Classification Search
CPC ...... F24F 13/28; F24F 8/10; F24F 8/90; F24F 8/108; B01D 46/0026; B01D 46/4263;
(Continued)

(56) References Cited

U.S. PATENT DOCUMENTS

2007/0060036 A1 * 3/2007 Shibuya ................ F24F 1/0063
454/187
2010/0199697 A1 * 8/2010 Sakashita ................ B08B 9/035
62/259.1

FOREIGN PATENT DOCUMENTS

EP    1927813 A1    6/2008
EP    2083225 A2 *  7/2009 ................ F24F 8/10
(Continued)

OTHER PUBLICATIONS

International Preliminary Report on Patentability for corresponding International Application No. PCT/JP2017/026852, dated Jan. 29, 2019 (10 pages).
(Continued)

*Primary Examiner* — T. Bennett McKenzie
(74) *Attorney, Agent, or Firm* — Osha Bergman Watanabe & Burton LLP

(57) ABSTRACT

A filter cleaning device for an air conditioner includes: a casing; a filter that is disposed in the casing and through which an air flow passes; a cleaning brush that is contactable with the filter surface and removes particulate matter from the filter surface; and a dust box that receives the particulate matter, and includes a housing accommodating the cleaning brush and having an opening through which the cleaning brush protrudes to contact a filter surface, a suction tool that includes an outlet in the housing to communicate with the
(Continued)

dust box, and applies a suction force to the dust box to remove the particulate matter from the dust box; and a lid that is movable between first and second positions, and closes the opening of the housing in the second position when the suction force is applied.

13 Claims, 15 Drawing Sheets

(51) Int. Cl.
*F24F 13/28* (2006.01)
*F24F 8/90* (2021.01)

(58) Field of Classification Search
CPC .... B01D 46/446; B01D 46/448; B01D 46/46; B01D 46/522; B01D 46/523; B01D 46/0082; B01D 2275/10; B01D 2279/50
USPC ...................................... 96/233; 55/282–305
See application file for complete search history.

(56) References Cited

FOREIGN PATENT DOCUMENTS

| | | | |
|---|---|---|---|
| EP | 2083225 A2 | 7/2009 | |
| EP | 2908065 A1 * | 8/2015 | ......... B01D 46/0065 |
| EP | 2908065 A1 | 8/2015 | |
| JP | H06-032926 U | 4/1994 | |
| JP | 2009-082837 A | 4/2009 | |
| JP | 2009082837 A * | 4/2009 | |
| JP | 2014-020658 A | 2/2014 | |
| JP | 2014020658 A * | 2/2014 | |
| KR | 10-2003-0083185 A | 10/2003 | |
| KR | 10-2004-0080810 A | 9/2004 | |
| WO | 2007/040276 A1 | 4/2007 | |
| WO | 2008/069379 A2 | 6/2008 | |
| WO | 2010/143230 A1 | 12/2010 | |
| WO | WO-2010143230 A1 * | 12/2010 | ............ F24F 1/0063 |
| WO | 2016/009351 A1 | 1/2016 | |

OTHER PUBLICATIONS

Notification Concerning Transmittal of International Preliminary Report on Patentability for corresponding International Application No. PCT/JP2017/026852, dated Feb. 7, 2019 (1 page).
International Search Report issued in corresponding International Application No. PCT/JP2017/026852 dated Oct. 12, 2017 (4 pages).
Extended European Search Report issued in corresponding European Application No. 16181790.3 dated Jan. 13, 2017 (7 pages).
Written Opinion issued in corresponding International Application No. PCT/JP2017/026852 dated Oct. 12, 2017 (9 pages).
Extended European Search Report issued in corresponding European Application No. 16181791.1 dated Jan. 13, 2017 (9 pages).

* cited by examiner

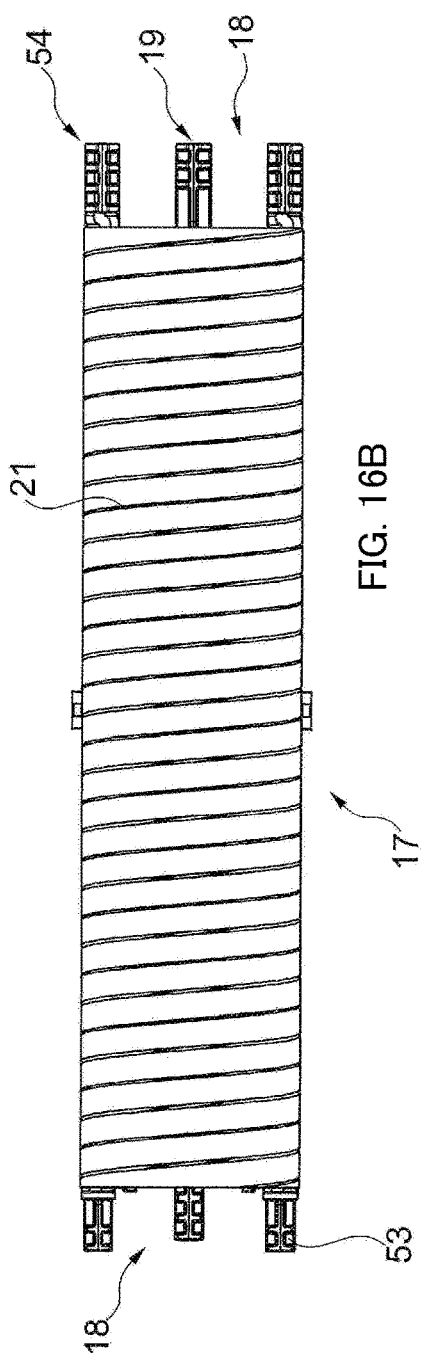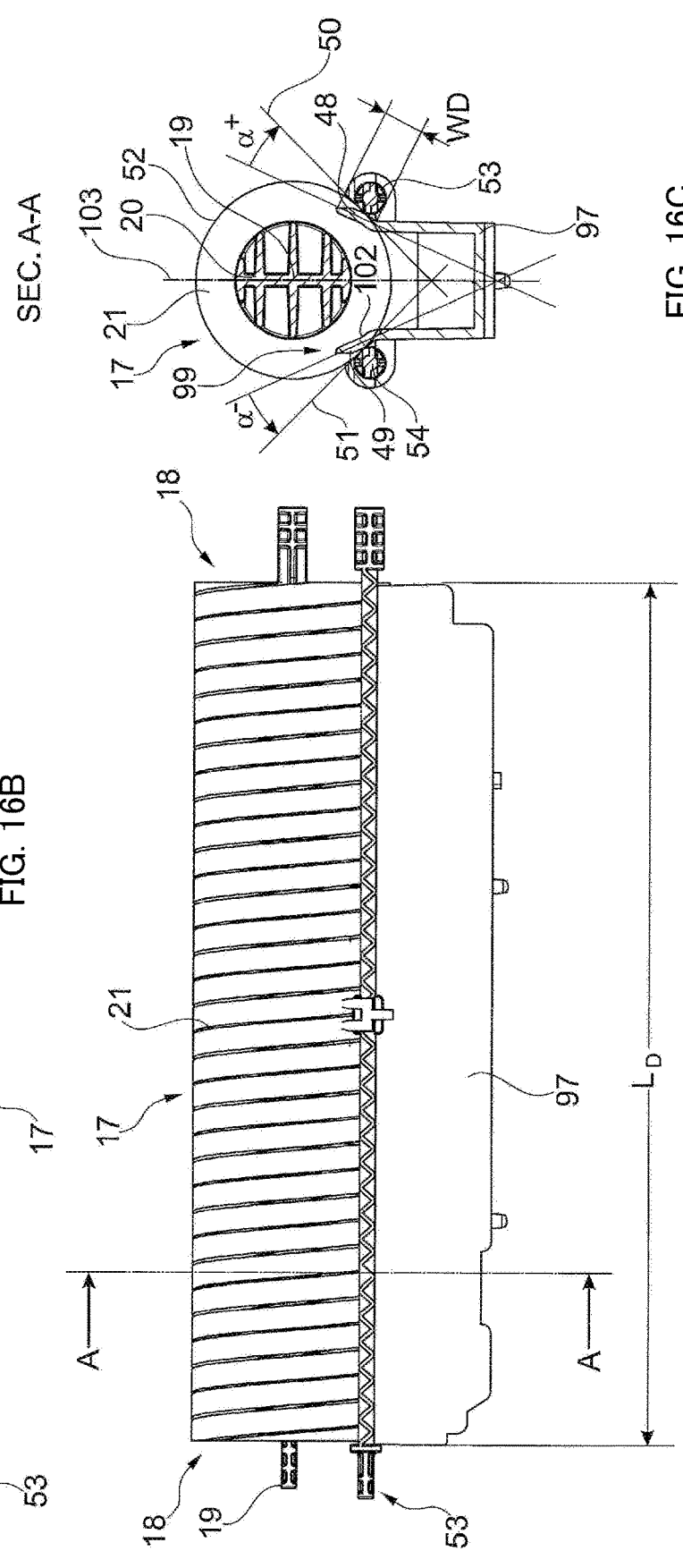

FILTER CLEANING DEVICE FOR AN AIR CONDITIONER AND AIR CONDITIONER HAVING SUCH FILTER CLEANING DEVICE

TECHNICAL FIELD

The present invention relates to filter cleaning devices for air-conditioners, particularly so-called duct-type air conditioners and to air-conditioners having such filter cleaning devices.

BACKGROUND ART

Air-conditioners are common in different buildings, particularly in commercial premises such as offices and hotels. In those premises often air-conditioners of the so-called duct-type are employed.

Duct-type air-conditioners are understood as air-conditioners of which the indoor unit is connected to an air ducting hidden behind a false ceiling or a false wall. In many cases, also the indoor unit is completely or partly hidden behind the false ceiling or the false wall. An air conditioner according to one or more embodiments is shown in FIG. 1.

Such duct-type air-conditioners 1 generally comprise air ducting 6, 7 located behind a false ceiling U or a false wall. One air ducting 6 leads to an exit grating 8 or exit terminal in a space to be conditioned such as an office, a corridor, a meeting room or a hotel room. Another air ducting 7 leads to an inlet grating 9 or inlet terminal which may either be located within the space to be conditioned or outside that space. The air ducting 7 may alternatively be connected to a ducting network supplying air centrally to a plurality of indoor units.

The air conditioner 1 has an indoor unit comprising a casing having an inlet 2 to which the air ducting 7 is connected and an outlet 3 to which the air ducting 6 is connected. A heat exchanger 4 is located within the casing downstream of the inlet 2 and downstream of one or more fans 5. Yet, the heat exchanger 4 may also be located upstream of the fan/-s 5. A filter 12 having opposite filter surfaces 13, 14 is disposed upstream of the heat exchanger 4 and in many cases located at or near the inlet 2.

An air flow is generated by the fan/-s 5 during operation of the air conditioner 1. Air flows from the inlet grating 9 via the air ducting 7 to the inlet 2, passes the filter 12 and subsequently the heat exchanger 4 for heating or cooling the air before being introduced into the space to be conditioned via the outlet 3, the air ducting 6 and the exit grating 8.

The filter 12 has the purpose of removing particulate matter such as dust and fibers from the air flow to avoid the parts of the air conditioner, particularly the heat exchanger 4, from being soiled and clogged.

Yet, the filter 12 requires regular cleaning to avoid clogging of the filter. Such clogging of the filter may result in an increased resistance to the air flow which requires a higher load on the fan/-s. Hence, clogging of the filter can reduce the efficiency of the air conditioner.

Yet, cleaning of the filter very often requires opening the false ceiling or the false wall and specialized maintenance engineers or cleaning personnel to remove and clean the filter. This is perceived negative. For this reason, systems have been suggested to simplify removal of the filter. Such systems are for example disclosed in KR 10 2003 0083185 A or KR 10 2004 0080810 A.

However, also these systems require cleaning personal to frequently access the spaces to be conditioned, which may disturb the people using the space. For this reason, filter cleaning devices have been suggested which are able to automatically clean the filter. One system uses a suction force for cleaning the filter, wherein a suction device is communicated with a suction nozzle moving along the filter surface, whereby the particulate matter adhering to the filter surface is removed by the suction force applied via the suction nozzle. Two examples of those devices are disclosed in WO 2007/040276 A1 and WO 2016/009351 A1. However, these devices are, on the one hand, perceived to be relatively complicated and hence expensive and, on the other hand, perceived to either not sufficiently remove the particulate matter or to require a relatively high suction force which may lead to damaging of the filter. The relatively high suction force is also required because it during appliance of the suction force air is sucked through the filter causing difficulties in building up a relatively large under pressure on the side of the filter to be cleaned.

To address these deficiencies, filter cleaning devices have been proposed using a mechanical cleaning member, such as a brush. The particulate matter removed from the filter by the brush is collected and retained in a dust box. The dust box will have to be emptied from time to time and is therefore in many cases removable. One type of those filter cleaning devices moves the filter along a fixed mechanical cleaning member for removing the particulate matter. Also the dust box is in these cases fixed relative to the casing of the filter cleaning device. Those devices however require a specific configuration of the filter, such as having a continuous belt shape or a large space into which the filter is moved before being returned to its original position. Alternative types of such filter cleaning devices disclose to slide the mechanical cleaning member along the filter surface with the dust box however being fixed relative to the casing. One such filter cleaning device is disclosed in JP H06-32926 U. Yet, also in this device the brush, being pressed against and slid along the filter, may damage the filter and/or push particulate matter into and even through the filter rather than removing the particulate matter from the filter. In addition, the dust box provided in this device is relatively large so that the entire system requires a lot of space, which in many cases is not available behind a false ceiling or a false wall. Furthermore, it is perceived negative to remove the dust box for emptying the dust box. Rather, it is considered more appropriate to empty the dust box by applying a suction force. However, if the dust box is relatively large and open to atmosphere at a relatively large area, it is difficult to build up a sufficiently high under pressure to remove the particulate matter from the dust box.

CITATION LIST

Patent Literature

[PTL 1] KR 10 2003 0083185 A
[PTL 2] KR 10 2004 0080810 A
[PTL 3] WO 2007/040276 A1
[PTL 4] WO 2016/009351 A1
[PTL 5] JP H06-32926 U

SUMMARY

In view of the aforesaid, one or more embodiments of the invention provide a filter cleaning device and an air conditioner comprising such a filter cleaning device which can overcome or at least reduce the above drawbacks of the prior art.

In particular, one or more embodiments provide a filter cleaning device having a dust box to be emptied by the use of a suction force and a corresponding air conditioner which are capable of reducing the required suction force for emptying the dust box.

According to one or more embodiments, a filter cleaning device having the features described below and an air conditioner having such filter cleaning device described below are suggested. The filter cleaning device for an air conditioner (1), particularly a duct-type air conditioner, the filter cleaning device comprising: a casing (11); a filter (12) disposed in the casing and to be passed through by an air flow, the filter having a filter surface (13); a cleaning member (16) contactable with the filter surface (13) for removing particulate matter from the filter surface; and a dust box (28) for receiving the particulate matter, the dust box comprising a housing (30) accommodating the cleaning member and having an opening (31) through which the cleaning member protrudes from the housing for contacting the filter surface, a suction section (32) configured to apply a suction force to the dust box for removing received particulate matter from the dust box, wherein the suction section comprises an outlet (37) in the housing to be communicated with the suction force; and a lid (39) movable between a first position and a second position, the lid closing the opening (31) of the housing in the second position, wherein the lid is in the second position when the suction force is applied. The air conditioner, particularly a duct-type air conditioner, has aforementioned filter cleaning device (10).

In accordance with one or more embodiments, the filter cleaning device for an air conditioner, particularly a duct-type air conditioner, comprises a casing. The casing of the filter cleaning device may be parallelepiped and be made of for example sheet-metal. The casing may further comprise an inlet and an outlet through which air to be flown through a filter enters and exits the casing, respectively. The filter is disposed in the casing and has a filter surface. The filter surface defines a width and a length of the filter. In particular, the filter may have two filter surfaces on opposite sides of the filter in the direction of the air flow. The filter can be flat and/or longitudinal. The filter can in principle be of any kind as long as it is configured to remove particulate matter, particularly dust and fibers, from the air flow flowing through the filter, and to be used in combination with an air conditioner. In one or more embodiments, the filter can comprise a frame holding a mesh made of for example plastic material or metallic material. Further, the filter cleaning device comprises a cleaning member, such as a brush or a special fabric designed to attract and hold dust and lint. A brush having a body and a plurality of bristles radially extending from the body is employed in one or more embodiments. The use of such a brush has the advantage that the speed with which the brush may be moved along the length of the filter can be higher and, thereby, the cleaning efficiency is increased. In addition, because of the use of bristles, optional reinforcing ribs of the filter may be accommodated by a larger bending of the bristles. Alternatively, it is also conceivable to substitute the bristles by a foamed material. The cleaning member is contactable with the filter surface (one of the filter surfaces) for removing particulate matter from the filter surface. Moreover, a dust box is provided for receiving particulate matter removed from the filter, particularly the filter surface, by the cleaning member. The dust box comprises a housing accommodating the cleaning member and having an opening through which the cleaning member protrudes from the housing for contacting the filter surface. The housing may extend from the dust box in a direction away from a bottom of the dust box. Further, the dust box may be disposed below the cleaning member in a direction of gravity, whereby the particulate matter removed from the filter by the brush falls into the dust box by gravity. Even more particular, the dust box may be disposed at an axial end of the cleaning member. Furthermore, the filter cleaning device comprises a suction section configured to apply a suction force to the dust box for removing received particulate matter from the dust box. The suction section comprises an outlet in the housing. The outlet may be disposed in the housing of the dust box or a separate channel/path may be provided communicating the housing and/or the dust box to the outlet. The suction force may for example be provided by a common vacuum cleaner as will be explained in more detail below. Further, the filter cleaning device comprises a lid movable between a first position and a second position, the lid closing the opening of the housing in the second position, wherein the lid is in the second position when the suction force is applied.

Accordingly, the cross-sectional area of any opening communicating the dust box with the atmosphere can be reduced to a minimum by closing the lid over the opening from which the cleaning member protrudes. Accordingly, when applying the suction force to the dust box by use of the suction section, the buildup of an under pressure within the dust box to remove particulate matter received in the dust box is possible even without applying a large suction force.

In one or more embodiments, the dust box is translationally moveable along the filter surface and the lid is movable into the second position when the dust box is in a parking position. The dust box is movable along the length of the filter surface alone or together with the cleaning member in one or more embodiments. In one or more embodiments, the dust box is movable to the parking position when no cleaning operation is required (e.g. during air conditioning operation). The parking position may be a position in which the dust box is moved beyond a longitudinal end of the filter in order to prevent any obstruction of the filter surfaces during air-conditioning operation. The dust box is movable along the length of the filter surface alone or together with the cleaning member in one or more embodiments. A movable dust box enables the construction of a relatively small size dust box. Hence, the dust box defines a relatively small space and cleaning of the dust box by use of a suction force is simplified, because the under pressure may be built up more easily in a small sized dust box.

Even further, the suction section may comprise a suction opening in the casing, wherein the outlet in the housing is connectable to the suction opening upon the movement of the dust box into the parking position. In this context, the dust box is movable within and relative to the casing.

In one or more embodiments, a simple mechanism is provided to enable the appliance of a suction force to the dust box for emptying the dust box even though the dust box is movable along the filter. In particular, the mechanism enables the connection of a suction opening at which a suction force can be applied to the dust box, particularly its outlet, automatically by the movement of the dust box along the length of the filter.

In one or more embodiments, the outlet has a center axis substantially parallel to the direction of said movement of the dust box. The outlet may be a circular opening. The outlet may further be communicated with the dust box via a cleaning path having a cleaning opening into the dust box.

Because the center axis is parallel to the direction of movement, a surrounding area of the opening may be used as a sealing surface perpendicular to the direction of movement. Accordingly, it is enabled to connect and seal the outlet and the suction opening by the movement of the dust box without the necessity of any additional mechanism, thus providing a simple device.

In this connection, a sealing such as an O-ring or the like can be provided, wherein the sealing is sandwiched between an area surrounding the outlet of the housing and an area surrounding the suction opening of the casing. More particular, when the outlet and the suction opening are connected, the sealing is pressed by movement of the dust box in the direction of the suction opening (in the direction of the parking position).

In one or more embodiments, the movement of the dust box not only automatically connects the suction opening and the outlet but also provides for an automatic sealing. Alternatively to the sealing, a shroud may be provided surrounding the outlet or the suction opening. Upon connection of the outlet and the suction opening, the shroud enters into the suction opening and engages with an inner circumferential surface of the suction opening, thereby achieving a sealing effect. However, to achieve a reliable and sufficient sealing, relatively small tolerances regarding the inner diameter of the suction opening and the outer diameter of the shroud are required. For this reason, the above-described sealing is used in one or more embodiments and, hence provides a simple and easy to manufacture means. In one or more embodiments, the above shroud may, hence, dispense the sealing function and merely provide for centering the outlet relative to the suction opening. For this purpose, the shroud may have a tapering towards the suction opening, whereby upon engagement of the shroud in the suction opening a self-centering effect is obtained.

As indicated earlier with respect to the dust box, it may be advantageous to dispose the housing outside the filter surface when the dust box is in the parking position.

According to one or more embodiments, the housing including the dust box are disposed outside the active area of the filter, namely outside of the filter surfaces when the dust box is moved to the parking position. Accordingly, during air-conditioning operation in which the dust box is located in the parking position, the whole active area of the filter may be used for filtering the air passing through the casing without any area of the filter being blocked by the housing. Thus, a very effective filtering can be realized.

In one or more embodiments, the lid is moveably fixed to the casing and comprises an actuating arm engageable with the dust box upon movement of the dust box in the direction of the parking position, whereby the lid is moved from the first position into the second position. In particular, the housing engages with the actuating arm in one or more embodiments.

Consequently, it is possible to close the lid, i.e. to move the lid into the second position, automatically by movement of the dust box in the direction of the parking position. This provides for a very simple and reliable mechanism for closing the lid without the necessity of any control or various parts. A further advantage of one or more embodiments is that the lid is always closed if the dust box is disposed in the parking position. This prevents any particulate matter from being drawn from the dust box and the housing during air-conditioning operation through the opening in the housing.

Alternatively, the lid is movable into the second position by the suction force. In particular, once the suction force is applied to the outlet of the housing an under pressure is generated within the dust box and the housing, whereby the lid is drawn/sucked into the second position in which the lid closes the opening of the housing.

These alternative embodiments provide for a similar simple and reliable mechanism for closing the lid without the necessity of any control and a plurality parts as the previous aspect.

In one or more embodiments, the lid may be rotatably fixed to the casing so as to be rotatable between the first and second positions. According to one or more embodiments, the actuating arm may be disposed at one end with respect to the rotational axis and a cover covering the opening may be disposed at the other end with respect to the rotational axis.

A rotational fixation of the lid relative to the casing is very effective from the viewpoint of providing a reliably movable lid without any risk of the lid getting stuck over to time. Also, a rotational fixation is simple and cost-effective from the viewpoint of manufacture.

Further, the lid may be biased in the direction of the first position. In other words, the lid is urged biased in a direction in which the opening of the housing is open. The leader may be biased by means of an elastic member such as a spring, particularly a leg spring.

Accordingly, the lid is always automatically transferred to the first position, when the cleaning operation is initiated. This is particularly beneficial, when the lid is moved to the second position by being engaged with the dust box, particularly the housing as described above. Because of the biasing into the first position, it can then be prevented that the lid gets caught by the dust box and the cleaning member when being moved along the filter during cleaning.

In one or more embodiments, the lid defines a cavity wherein the cavity, in the second position of the lid, accommodates that part of the cleaning member protruding through the opening from the housing. Particularly, the cavity may be formed in a covering of the lid.

According to one or more embodiments, the area surrounding the cavity can be brought into contact or abutment with the area of the housing surrounding the opening. Consequently a relatively tight closure of the opening of the housing may be achieved. In addition, a sealing may be provided in said area in the same manner as described above with respect to the suction section. Such a sealing could further enhance the sealing of the opening in the housing by the lid.

Besides the above filter cleaning device, also an air conditioner, particularly a duct-type air conditioner, having such filter cleaning device is suggested. Even though a duct-type air conditioner may be used, the present filter cleaning device may also be applied to other air-conditioners in which a filter requires regular cleaning.

According to one or more embodiments, the air conditioner further comprises a suction socket fluidly connected to the above-described suction opening of the casing and configured for receiving the suction force of e.g. a vacuum cleaner for removing the particulate matter received in the dust box by the vacuum cleaner.

The suction socket may be configured to receive a fitting and/or a hose of a common vacuum cleaner and may be accessible in the false ceiling or a false wall without the necessity to remove a part of the ceiling or wall. Further, it may as well be conceivable to dispose the suction socket outside the room (space) to be conditioned via the air conditioner. Thus, cleaning personal is enabled to remove particulate matter from the dust box without having to enter the room to be conditioned such as the hotel room or a meeting room.

Further features and advantages are described in the following description of one or more embodiments, which makes reference to the accompanying drawings. The drawings show in:

BRIEF DESCRIPTION OF DRAWINGS

FIG. 16A shows a side view of the brush according to one or more embodiments, FIG. 16B shows a front view of the brush to be engaged with the filter surface according to one or more embodiments, and FIG. 16C shows a cross-section along the line A-A in FIG. 16A.

DETAILED DESCRIPTION OF EMBODIMENTS

Figure 2:
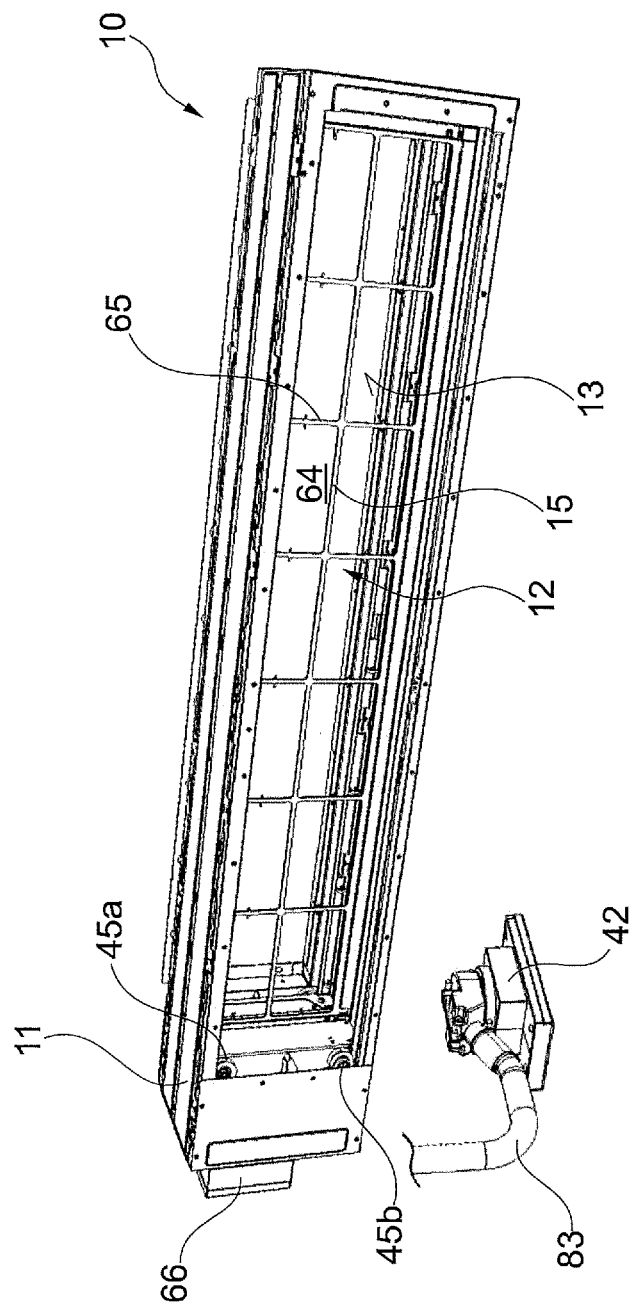
FIG. 2 shows a perspective view of a filter cleaning device according to one or more embodiments of the present invention.
Figure 3:
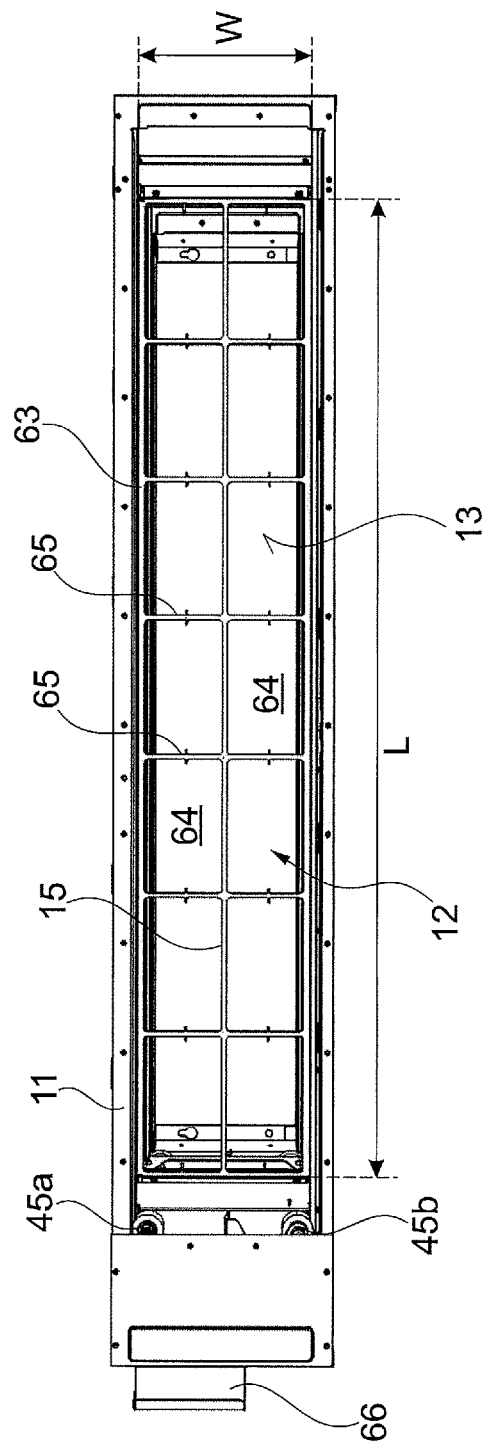
FIG. 3 shows a front view of the filter cleaning device as shown in FIG. 2.
Figure 4:
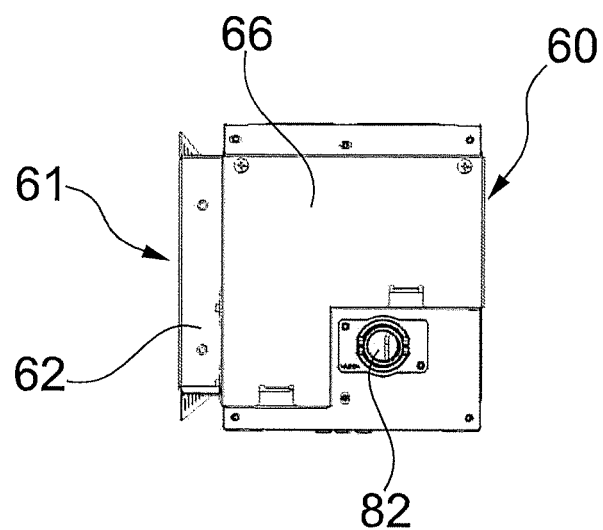
FIG. 4 shows a side view of the filter cleaning device as shown in FIG. 2.

FIGS. 2 to 4 generally show a filter cleaning device 10 according to one or more embodiments. The filter cleaning device comprises a casing 11. The casing 11 has a casing inlet 60 and a casing outlet 61. In operation of the air conditioner, air flows through the casing 11 from the casing inlet 60 to the casing outlet 61 passing the filter 12.

Figure 1:
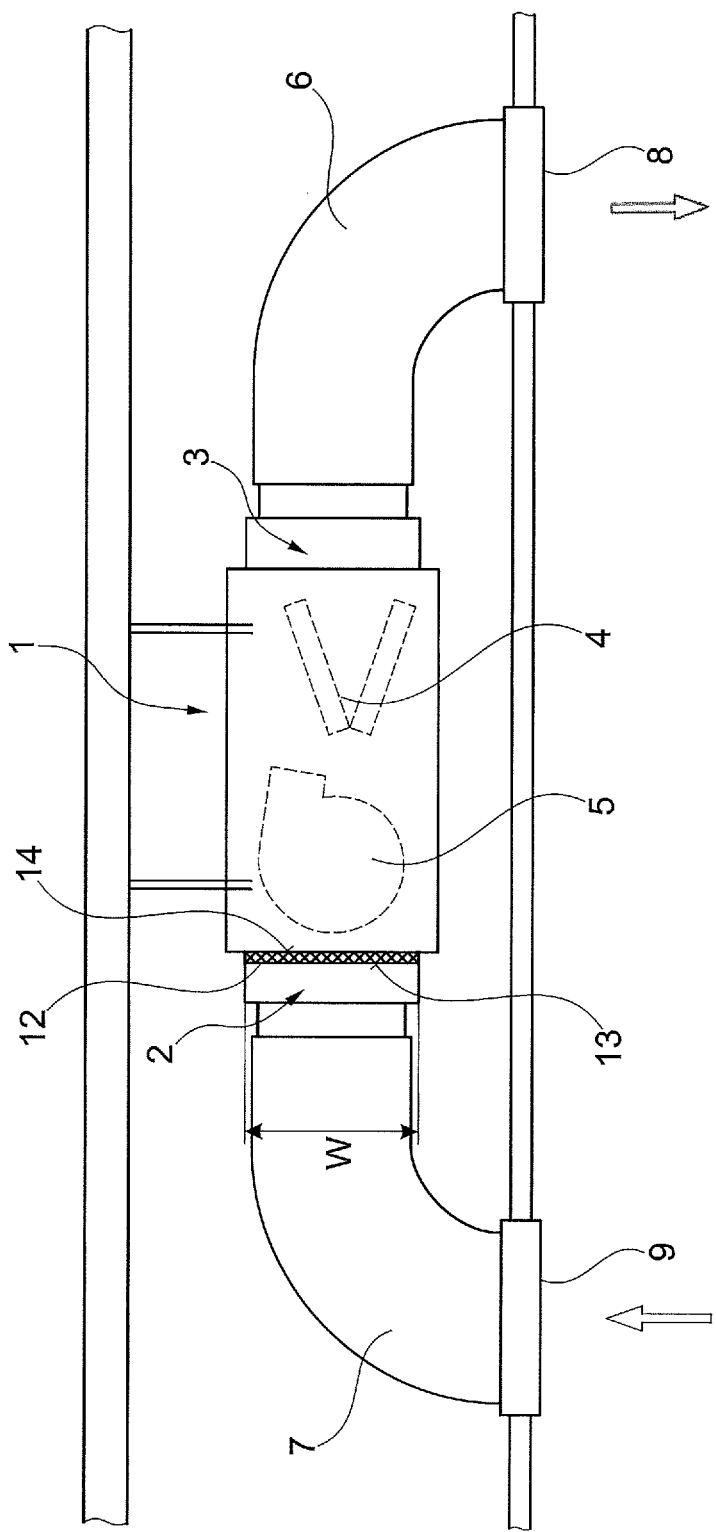
FIG. 1 shows a schematic view of a duct-type air conditioner according to one or more embodiments.

The filter cleaning device 10 may be mounted to existing air-conditioners such as the one depicted in FIG. 1, wherein the existing filter 12 is first removed from the existing indoor unit and a filter cleaning device 10 is attached to the inlet 2 of the existing casing at a flange 62. Alternatively, the filter cleaning device 10 as described herein may already be integrated into the casing of an indoor unit of an air conditioner at the time of production of the air conditioner.

A control box 66 is attached to one side of the casing 11 and configured to control the cleaning operation of the filter 12 described later.

The filter 12 contained in the filter cleaning device 10 is longitudinal and flat having a length L and a width W. In one or more embodiments, the length L is larger than the width W, whereby the filter 12 is longitudinal. Further, the lengths L and the width W are both much larger than the thickness/height, whereby the filter 12 is flat.

Further, the filter 12 comprises a frame 63 of plastic material, which is molded about a mesh 64 made of plastic material, metal or other suitable material. One longitudinal reinforcing rib 15 and a plurality of transverse reinforcing ribs 65 are provided in order to stabilize the mesh 64 over the length and widths of the filter 12. The filter has a first filter surface 13 facing the inlet 60 and a second filter surface 14 facing the outlet 61. The first and second filter surfaces 13, 14 can be best seen in FIG. 6.

The filter cleaning device 10 further comprises a cleaning unit 67 configured to clean the filter 12 and particularly its mesh 64. The cleaning unit 67 comprises cleaning member unit 67a and a counter surface unit 67b.

The cleaning member unit 67a has a mechanical cleaning member 16 in the form of a brush 17. The brush 17 consists of a body 20 from which a plurality of separate bristles 21 extend in a radial direction. As can be best seen from the cross-sectional view in FIG. 9 and the perspective in FIG. 14, the brush 17 has a cylindrical shape and is rotatable about an axis of rotation 19, which corresponds to the center axis of the cylinder. The axis of rotation 19 is parallel to the filter surface 13 in one or more embodiments. Furthermore, the axis of rotation 19 of the brush 17 is disposed in a distance to the filter surface 13 which is smaller than the diameter of the brush to ensure contact of the brush 17 with the filter surface 13. Yet, the distance is larger than the diameter of the body 20 to prevent any damaging of the filter by the brush 17 according to one or more embodiments.

Figure 14:
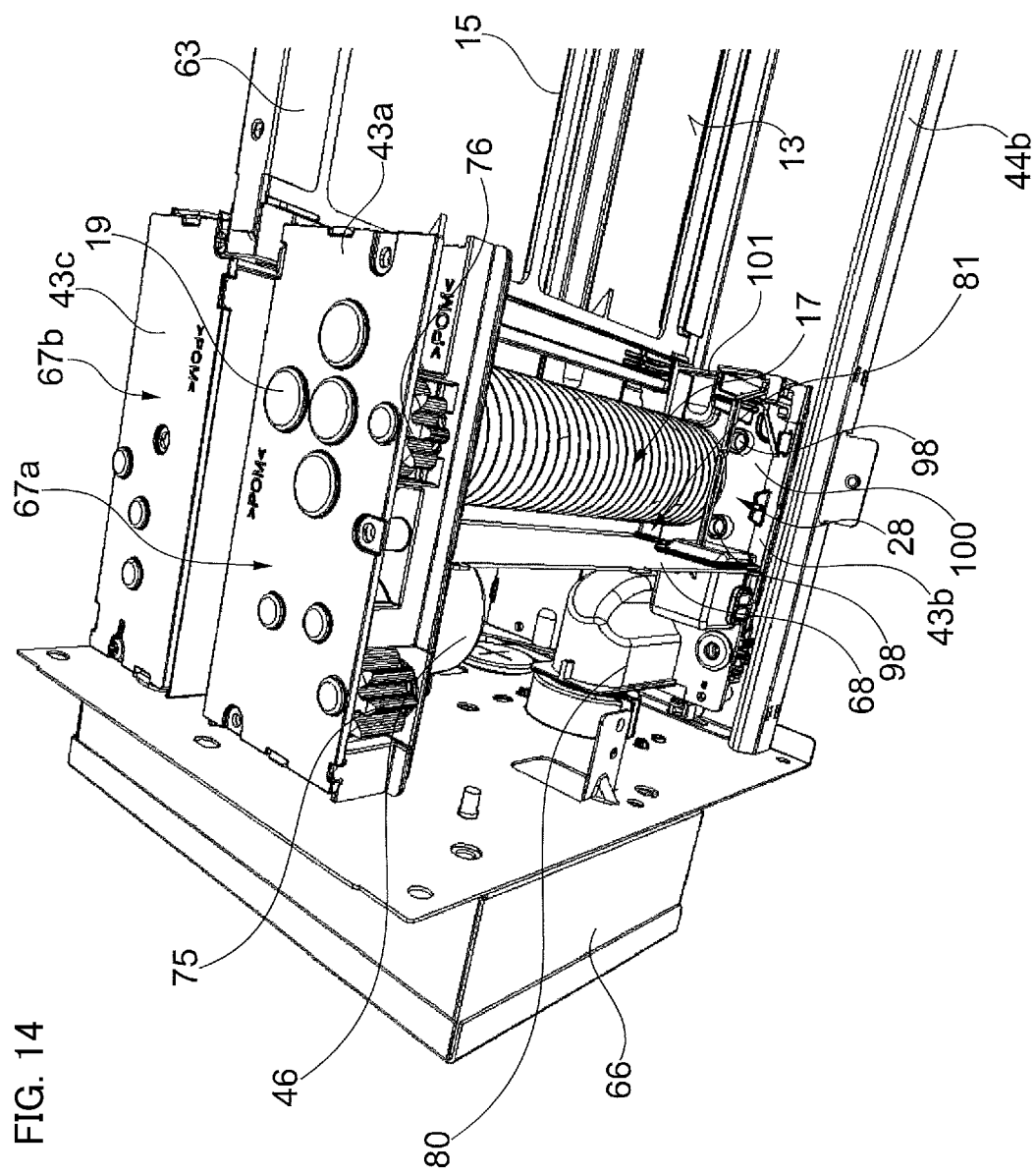
FIG. 14 shows a partial isometric view of the filter cleaning device shown in FIG. 2 with some parts removed.

Considering FIG. 14, the brush 17 is basically supported at both its axial ends 18 by supports 43a, 43b forming a support unit. The supports 43 rotatably support or retain the brush 17.

The lower support 43b is embodied as a dust box 28. In particular, the lower support 43b has a bottom 100 and sidewalls 101 surrounding the bottom, whereby the dust box 28 is formed (see FIG. 14).

The upper support 43a and the lower support 43b of the support unit are respectively provided with two wheels 45a, b. The wheels 45a of the upper support 43a are rotatably fixed to the upper support 43a or an upper portion of a wall 88 of a housing 30 connecting the supports 43a, 43b, respectively. The housing 30 connects to the side walls 100 of the dust box 28 and provides for a shielding effect as described in more detail below. The wheels 45a are rotatable about an axis of rotation 69.

The wheels 45b of the lower support 43b are rotatably and pivotably fixed to the lower support 43b or a lower portion of the wall 88 of the housing 30. In particular, the wheels 45b are rotatably fixed to a pivot arm 71 about an axis of rotation 69 and the pivot arm 71 is pivotably fixed to the lower support 43b or a lower portion of the wall 88 of the housing 30 about a pivot 70. Furthermore, a spring (as an example of the second elastic member) 47 is fixed at one of its opposite ends to the pivot arm 41 of one wheel 45b and the other one of its opposite ends to the pivot arm of the other wheel 45b. Accordingly, the wheels 45b are urged towards each other about the pivots 70.

The wheels 45a at the top are engaged with a longitudinal top guide rail 44a (guide) extending in a length direction of the filter 12 along the filter cleaning device 10. The same applies for the wheels 45b at the bottom, which are engaged with a longitudinal bottom guide rail 44b (guide) extending substantially in parallel to the top guide rail 44a.

Accordingly, the support unit is movably guided between the guide rails 44a, 44b and hence movable along the length of the filter 12 or its filter surface 13, respectively.

Figure 12:
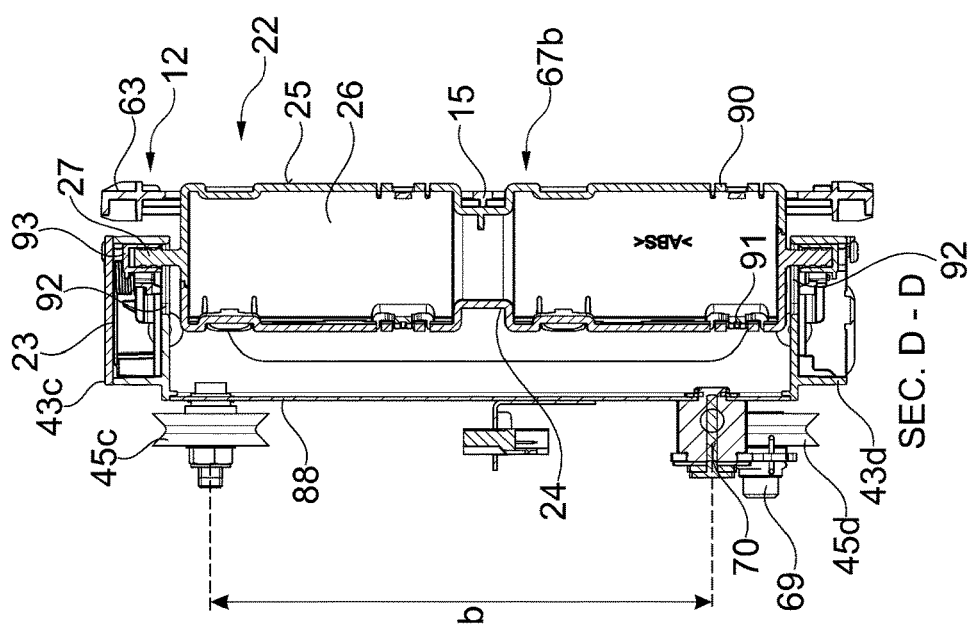
FIG. 12 shows a cross-section along the line D-D in FIG. 11.

The filter 12 and consequently also the guide rails 44a, 44b can be relatively long. As a consequence, bending of the guide rails 44a, 44b may occur with the result that the distance D (see FIG. 12 with respect to the counter surface unit 67b) parallel to the filter surface 13 and between opposite guide rails 44a, 44b at the top and bottom is not constant over the lengths of the guide rails 44a, 44b. As described earlier, the wheels 45b of the lower support 43b are urged towards each other by the spring 47 about the pivots 70. Accordingly, the wheels 45b are urged towards a position in which their distance D to the wheels 45a at the upper support 43a is the largest. Thus, if the distance D between the opposite guide rails 44a, 44b becomes larger, the wheels 45b pivot counterclockwise (left wheel 45b in FIG. 10) and clockwise (right wheel 45b in FIG. 10) about the pivot 70 by the force of the spring 47. Thereby, the wheels 45b at the lower support 43b remain securely engaged with the lower guide rail 44b as do the wheels 45a at the upper support 43a. Similar, if the distance D between opposite guide rails 44a, 44b becomes smaller, the wheels 45b pivot in the opposite direction, thereby automatically compensating for the change in distance D. Accordingly, support unit may reliably be moved along the guide rails 44a, 44b without becoming loose or stuck.

As previously mentioned, the brush 17 is rotatably supported in the support unit. As a result, the support unit serves to move the brush 17 along the filter surface 13. For movement of the support unit along the filter 12, the support unit is driven.

According to one or more embodiments, a rack 72 (see FIG. 13) is provided extending along the filter 12 in parallel to the guide rails 44a, 44b. Furthermore, the support unit comprises a motor 46 (see FIG. 14) which may be a stepping motor. The motor 46 is attached to the upper support 43a, thus avoiding any possible contact with condensate accumulating at the bottom of the filter cleaning device. Further, the motor 46 is with its axis connected to a first gear 73 rotatably attached to the upper support 43a. The first gear 73 meshes with a second gear 74 again meshing with a third gear 75. Also the second and third gear 74 and 75 are rotatably attached to the upper support 43a. The third gear 75 meshes with the rack 72.

Accordingly, the motor 46 rotates the first gear 73, whereby the second gear 74 and the third gear 75 are rotated. Thus, the rotational force is transmitted via the gears 73 to 75 to the rack 72. The rack 72 converts the rotational force into a translational force, whereby the support unit and, hence, the brush 17 rotatably supported therein, are moved along the rack 72 and thereby along the filter 12.

Figure 13:
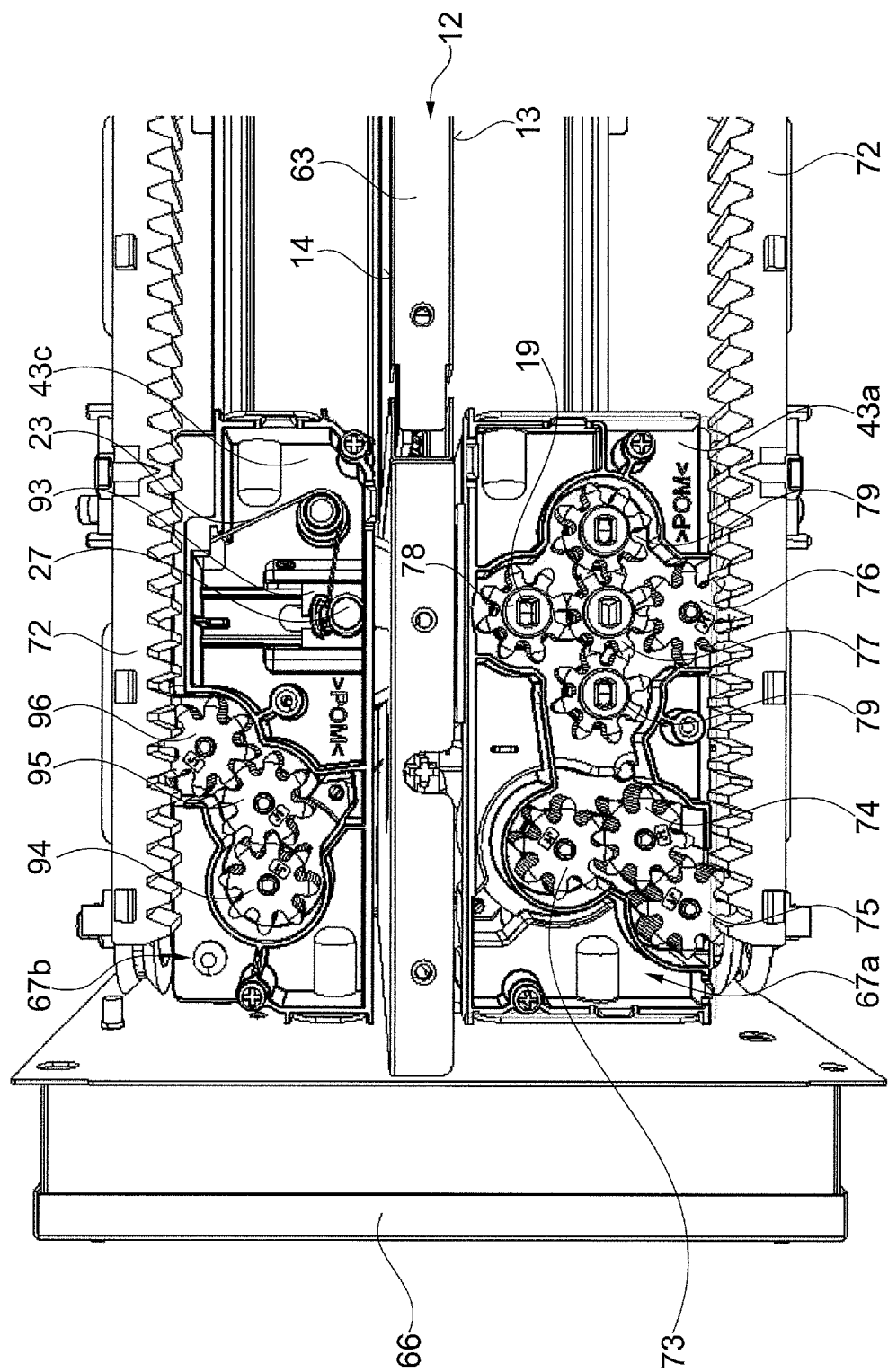
FIG. 13 shows a partial isometric top view of the filter cleaning device shown in FIG. 2 with some parts removed.

FIG. 13 additionally shows a fourth gear 76 again meshing with the rack 72. A centrally arranged fifth gear 77 meshes with the fourth gear 76 to transfer the rotation to a sixth gear 78. The axis of rotation 19 of the brush 17 is fixed to the axis of rotation of the sixth gear 78. Accordingly, upon operation of the motor 46 and movement of the support unit along the rack 72, the movement of the support unit along the rack 72 results in rotation of the fourth gear 76 meshing with the rack 72. As a consequence, the translational movement of the support unit along the rack 72 is converted into a rotational movement. This rotation is transferred via the centrally arranged fifth gear 77 to the sixth gear 78 thereby rotating the brush 17. In this context, if the support unit moves in FIG. 13 to the right, the fourth gear 76 is rotated clockwise whereby the centrally arranged fifth gear 77 is rotated counterclockwise and the sixth gear 78 again rotates clockwise. If the support unit moves in FIG. 13 to the left, the fourth gear 76 is rotated counterclockwise whereby the centrally arranged fifth gear 77 is rotated clockwise and the sixth gear 78 again rotates counterclockwise. Thus, the brush 17 is rotated in opposite directions and depending on the direction of movement of the support unit. In particular, the brush 17 is always rotated in the direction of movement. In other words, the upstream side of the brush 17 is always rotated against the filter surface 13 whereas the downstream side of the brush 17 is always rotated away from the filter surface 13.

As will be apparent from the above description, only one motor 46 is used to move the support unit and hence the brush 17 along the filter 12 and hence its filter surface 13, and to rotate the brush 17.

Figure 5:
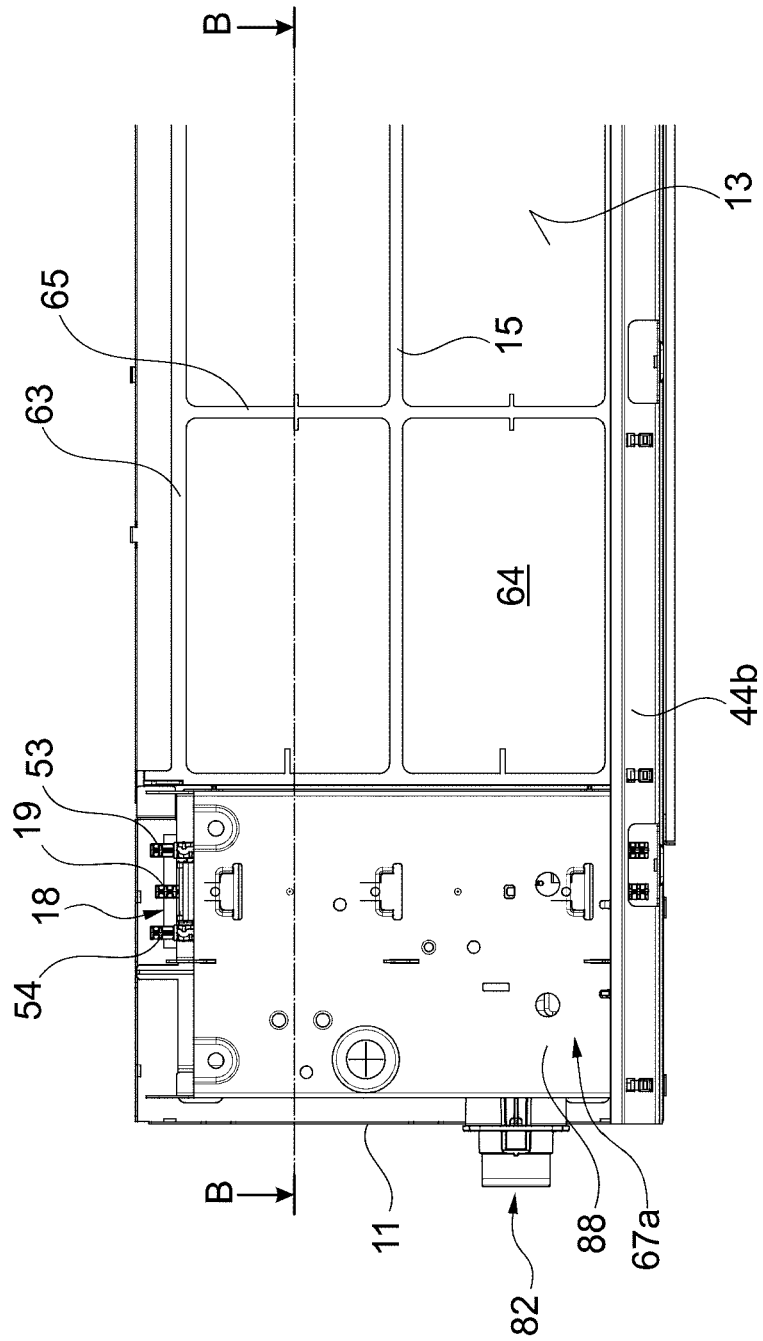
FIG. 5 shows a partial side view of the filter cleaning device shown in FIG. 2 with the front plate and other parts being removed and with the brush in a parking position.
Figure 6:
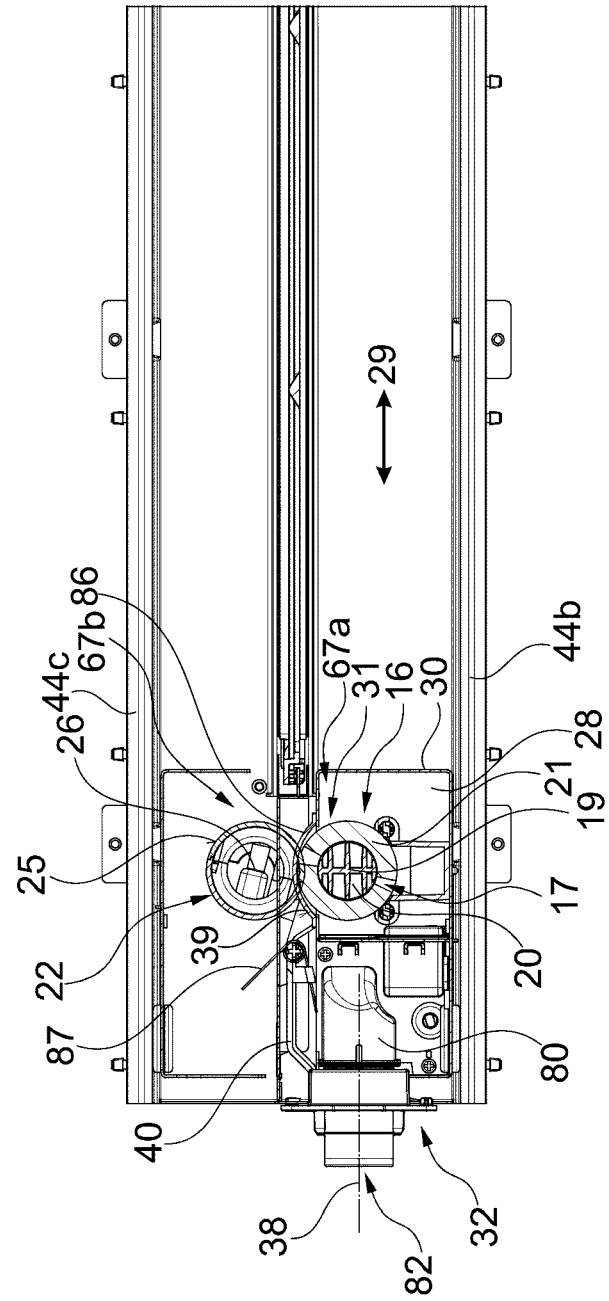
FIG. 6 shows a cross-section along the line B-B in FIG. 5.

Due to the movability of the cleaning member unit 67a and hence the brush 17 in a longitudinal direction of the filter 12 as explained above, the cleaning member unit 67a may be moved to a parking position shown in FIGS. 5 and 6 during non-cleaning operation of the cleaning unit. In one or more embodiments, the cleaning unit does not overlap with the filter surfaces 13, 14 of the filter 12 in this parking position as seen in a plan view such as in the cross section of FIG. 6 or in a front view as shown in FIG. 5. Thus it can be prevented that any portion of the filter 12 is blocked by the cleaning unit during non-cleaning operation, that is during air-conditioning operation. Thus, the cleaning unit does not represent any obstruction to the air flow flowing through the filter 12 and the whole filter surface 13, 14 may be used.

Figure 15:
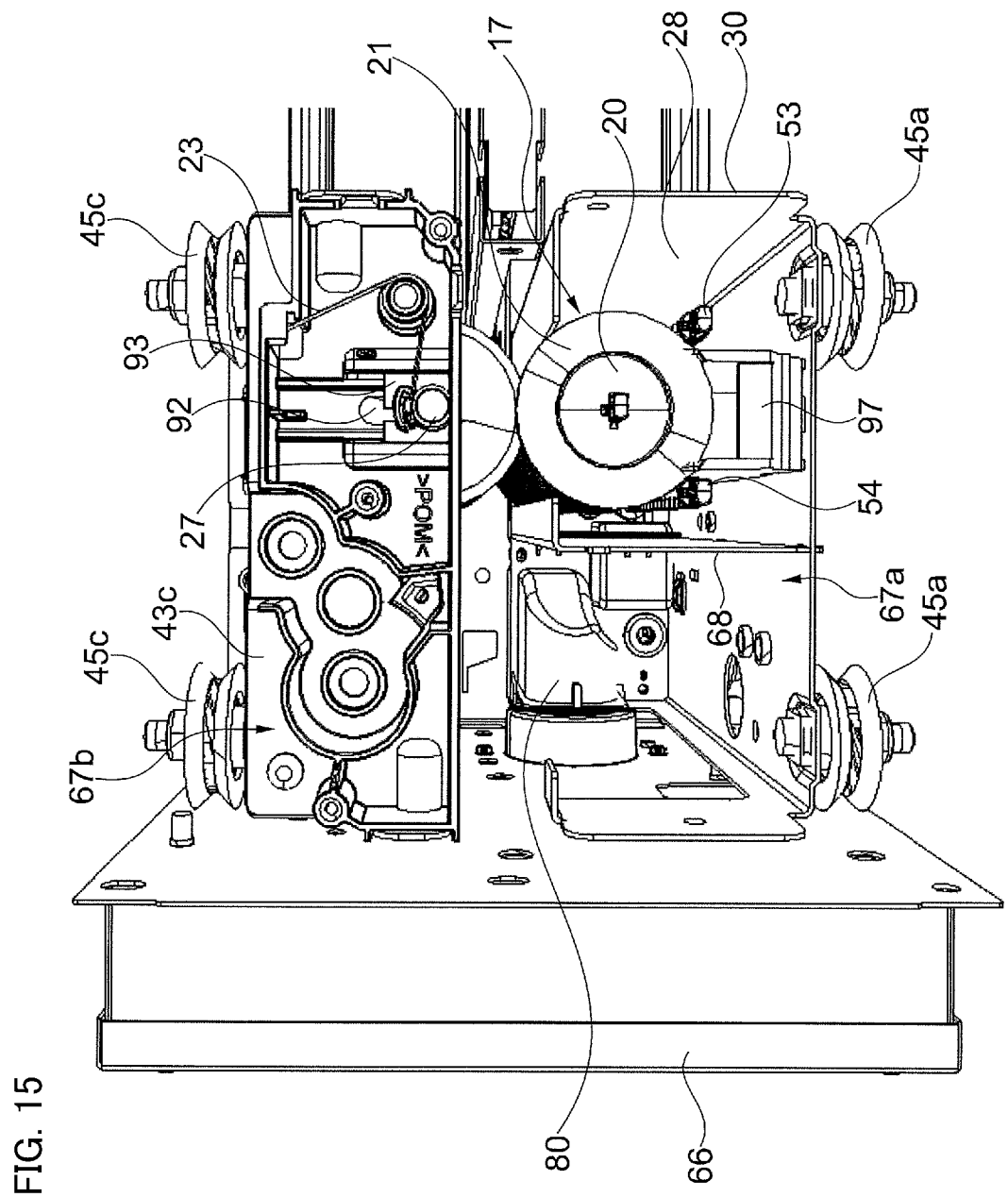
FIG. 15 shows a partial isometric top view of the filter cleaning device shown in FIG. 2 with some parts removed.

When the brush 17 and particularly its bristles 21 brush along the filter surface 13 and remove the particulate matter therefrom, particulate matter may adhere to the bristles 21. In order to remove the particulate matter from the bristles 21 and, hence, the brush 17, the cleaning unit further comprises a first comb shaped member 48 and a second comb shaped member which are respectively engaged with the brush 17 and particularly the bristles 21 (see FIGS. 16A-16C). The comb shaped members 48 and 49 extend parallel to the axis of rotation 19 of the brush 17 along the whole axial lengths of the brush 17. Thus, the comb shaped members 48 and 49 have a length along the axial direction and a width perpendicular thereto (seen in the cross-sectional view in FIG. 16C). The comb shaped members 48 and 49 further have in their width direction a free edge 99 respectively engaged with the bristles 21 of the brush 17. The opposite edge of the comb shaped members 48 and 49 is respectively connected or integrally formed with a comb body 97. As shown in FIG. 15, the comb body 97 is fixed to the housing 30 or more particularly the back wall 88 of thereof.

The comb shaped members 48 and 49 are respectively formed along the length direction with a plurality of teeth 102 separated by recesses. In other words, the comb shaped members are configured of a plurality of merlons and crenels. The teeth 102 extend in the width direction from the comb body 97. The cross-sectional line A-A extends through one of the teeth 102. The two comb shaped members 48 and 49 are respectively angled or inclined with their width direction in opposite directions, that is away from each other. To put it differently, the comb shaped members 48 and 49 are inclined in different directions with respect to an axis of symmetry 103. In particular, the teeth 102 are angled or inclined as described above. As may be best seen from the cross-section in FIG. 16C), the comb shaped members 48 and 49 are respectively arranged symmetrically to the line of symmetry 103. As shown, the comb shaped members 48 and 49 are angled by a positive angle $\alpha^+$ and a negative angle $\alpha^-$, respectively. In particular, drawing a circle 52 being the outer diameter of the bristles 21 or at least co-axial with the outer diameter of the bristles 21 and drawing a first and second tangent 50, 51 to the circle which are perpendicular to each other, the first comb shaped member 48 is angled clockwise at a negative angle $\alpha^-$ and the second comb shaped member 48 is angled counterclockwise at a positive angle $\alpha^+$ with their width direction. The absolute value of the angles $\alpha$ is however the same to provide for a symmetric arrangement. In this context, the width direction is drawn as a centerline in the cross-section in FIG. 16C at that position of the comb shaped members having the largest thickness perpendicular to the width direction WD and the length direction LD. Accordingly, if the brush 17 is rotated clockwise in FIG. 16C), the comb shaped member 48 is inclined towards the direction of rotation of the brush 17. If the brush 17 is rotated counterclockwise, the comb shaped member 49 is inclined towards the direction of rotation of the brush 17. Accordingly, it can be effectively achieved that the bristles 21 of the brush 17 and to the recesses between the teeth 102 so that any particulate matter can be scrapped of the bristles 21.

As described above, the brush 17 may rotate in opposite directions and depending on the movement of the support unit. Thus, if the brush rotates clockwise, the first comb shaped member 48 serves for removing or loosening the particulate matter from the bristles 21, whereas if the brush rotates counterclockwise, the second comb shaped member 49 provides for this effect. Thus, a very effective cleaning of the bristles 21 may be affected no matter in which direction the brush 17 rotates.

Furthermore, a first and second separation roller 53 and 54 are provided wherein the first separation 53 is associated to the first comb shaped member 48 and the second separation roller 54 is associated to the second comb shaped member 49. Both separation rollers 53, 54 extend parallel to the axis of rotation 19 of the brush 17. The separation rollers 53, 54 are respectively provided in order to remove the particulate matter loosened by the comb shaped members 48, 49 from the bristles 21 away from the brush 17 so that the particulate matter falls into or towards the bottom 100 of the dust box 28 by gravity. For this purpose, the separation rollers 53, 55 are rotated in the same direction as the brush 17. In particular, the separation rollers 53, 55 is there a centrifuge particulate matter coming into contact with the separation rollers away from the brush 17 and the comb shaped members 48, 49 or at least create an air flow blowing the loosened particulate matter away. In this context, the separation rollers 53 and 54 are located on an outer side of the comb shaped members 48, 49 with respect to the axis of rotation 19 of the brush 17, respectively.

According to one or more embodiments, two seventh gears 79 (see FIG. 13) are provided meshing with the centrally arranged fifth gear 77. These seventh gears 79 are respectively attached to the axes of rotation of the first and second separation rollers 53 and 54 at their axial ends. As the sixth gear 78 also the seventh gears 79 will be rotated automatically by movement of the support unit along the rack 72 and rotation of the fourth gear 76. The axial ends of the separation rollers 53 and 54 opposite to the seventh gears 79 are rotatably accommodated in the collars 98 at the bottom of the support unit (lower support 43b) as shown in FIG. 14. In the above embodiments, when the support unit moves to the right, both seventh gears 79 are rotated counterclockwise, whereas both seventh gears 79 are rotated clockwise when the support unit moves to the left. Accordingly also in this case, the motor 46 is used to rotate the first and second separation rollers 53, 54 in the same direction as the brush 17.

The support unit further comprises the housing 30 and a partition 68. The housing 30 together with the partition 68 forms a chamber accommodating the brush 17. That chamber is communicated with the dust box 28 in which particulate matter brushed off the filter 12 or its filter surface is retained before being removed by a vacuum source as explained later. The housing 30 together with the partition 68 further defines an opening 31 through which a portion of the brush 17 extends (see FIG. 9). Thereby it is ensured that the brush protrudes from the housing 30 and is capable of contacting and brushing the filter surface 13. Further, the housing 30 prevents particulate matter removed from the filter by the brush from being distributed throughout the filter cleaning device. Moreover, the housing 30 shields the dust box 28 and prevents particulate matter already collected in the dust box from being sucked from the dust box during the air conditioning operation. In addition, the relatively small opening 31 enables to reduce exchange of air at the dust box 28, when removing the particulate matter from the dust box using a vacuum source. Thus, building up a relatively high under pressure is simplified.

Figure 8:
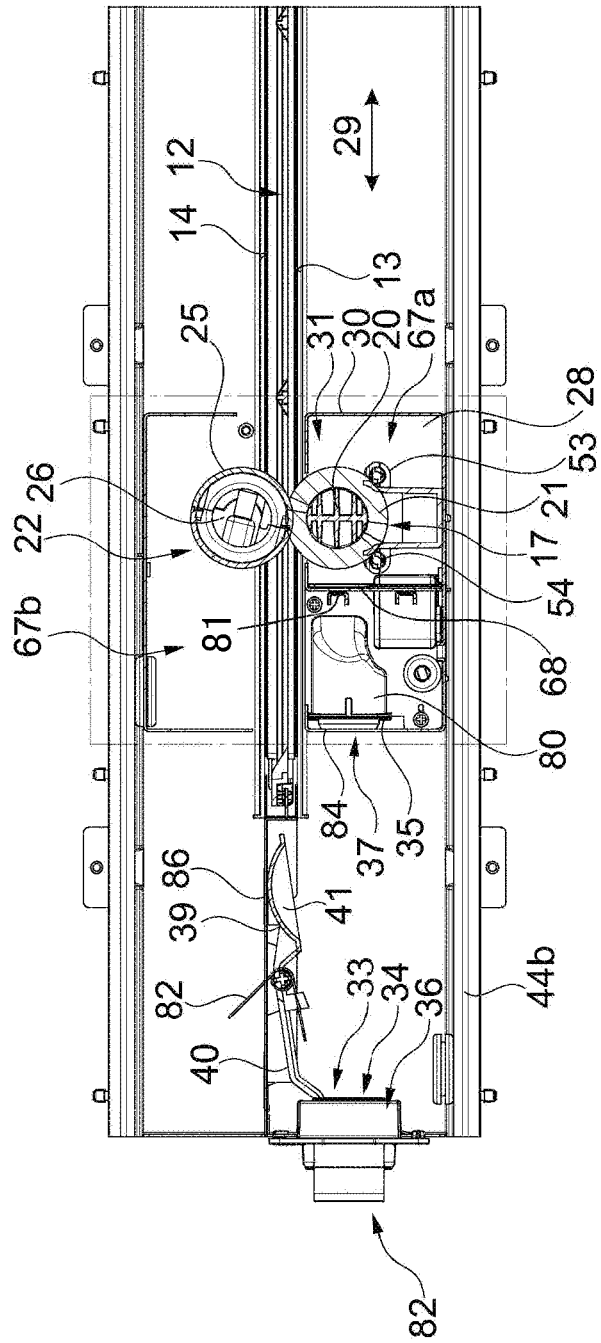
FIG. 8 shows a cross-section along the line C-C in FIG. 7.
Figure 9:
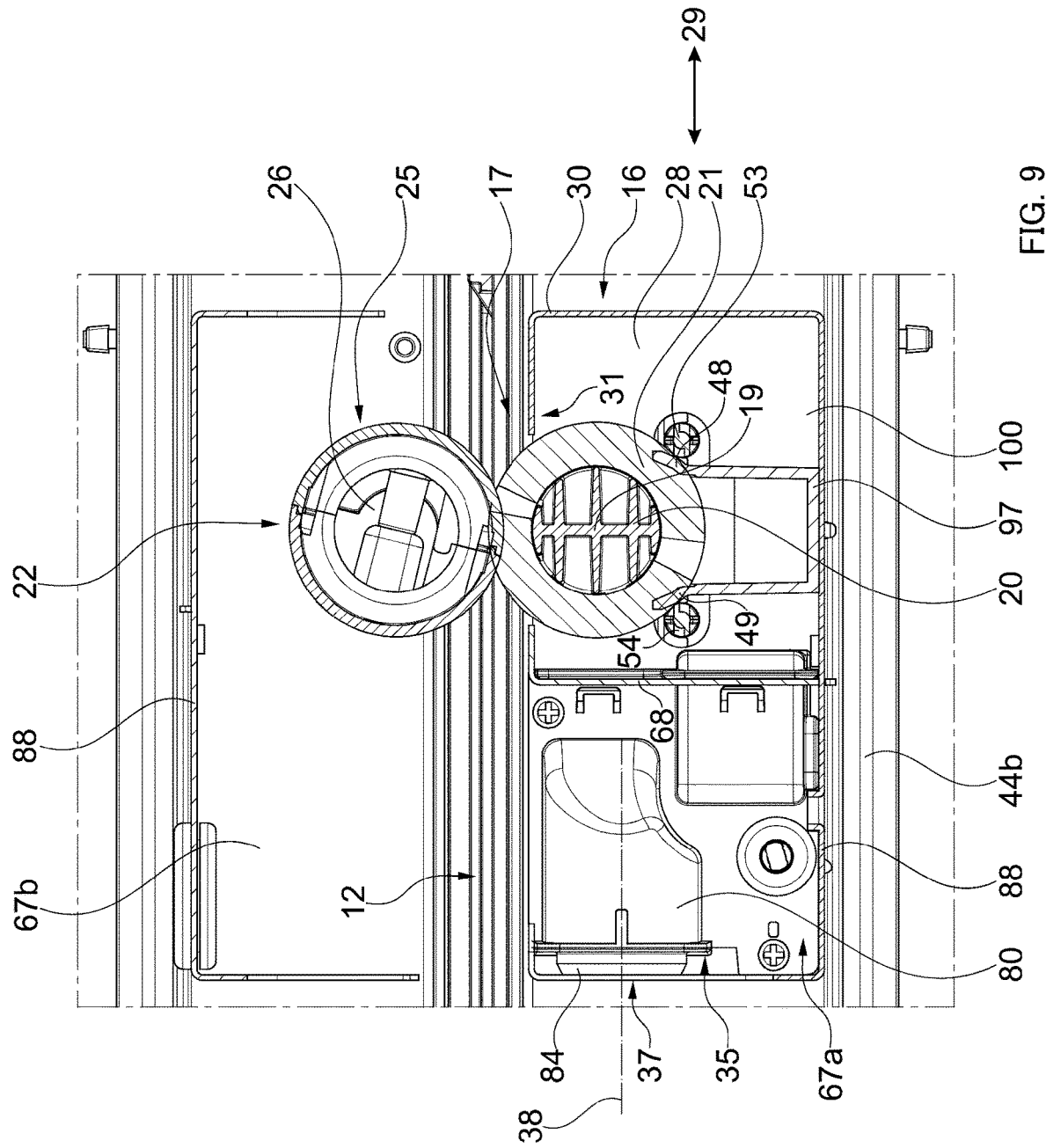
FIG. 9 shows the detail D of FIG. 8.

Moreover, a suction section (suction tool) 32 as shown in FIGS. 6, 8 and 9 is provided for removing the dust accumulated in the dust box 28 from the dust box. The suction section 32 comprises an outlet 37. The outlet 37, which may be a circular opening, has a center axis 38. The outlet 37 is communicated with the dust box 28 via a cleaning path 80 having a cleaning opening 81 (see FIG. 14) opening into the dust box 28.

The suction section 32 further comprises a suction opening 33 fixed to the casing 11 of the filter cleaning device. In one or more embodiments, a fitting extends from the casing 11 and forms the suction opening 33 at the inside of the casing 11, The fitting further has an exhaust opening 82 at the outside of the casing 11. The suction opening 33 and the exhaust opening 82 may be both circular. The center axis of at least the suction opening 33 is congruent with the center axis 38 of the outlet 37.

In one or more embodiments, a suction socket 42 (see FIG. 2) may be communicated to the suction opening 33 via a hose 83 connected to the exhaust opening 82 at one end and to the suction socket 42 at the other end. The suction socket 42 may be configured to receive a fitting and/or a hose of a common vacuum cleaner and may be accessible in the false ceiling U or a false wall without the necessity to remove a part of the ceiling or a wall. Further, it may as well be conceivable to dispose the suction socket 42 outside the room to be conditioned via the air conditioner. Thus, cleaning personal is enabled to remove dust from the dust box 28 without having to enter the room to be conditioned such as the hotel room or a meeting room.

Once the cleaning operation is finished, the cleaning unit moves towards the left in FIG. 8 until it reaches the parking position mentioned above. In this parking position the outlet 37 is communicated with the suction opening 33, whereby the dust box 28 is communicated via the cleaning opening 81, the cleaning path 80, the outlet 37 to the suction opening 33 and, hence, to the exhaust opening 82.

A sealing member 34 is provided at an area 35 surrounding the outlet 37 and/or an area 36 surrounding the suction opening 33. Upon movement of the cleaning unit to the parking position, the sealing 34 is sandwiched and pressed between the area 35 and the area 36 and the outlet 37 is communicated with the suction opening 33. In order to be sufficiently pressed, the stepping motor 46 is controlled by the control box 66. Upon a feedback of a positioning sensor (such as a limit switch) that the cleaning unit has reached the parking position the control is configured to move the cleaning unit towards the left (in the direction of the parking position) at least one additional distance (one or more steps of the stepping motor). Accordingly a relatively tight and reliable seal can be achieved.

Additionally or alternatively to the sealing 34, a shroud 84 may be provided surrounding the outlet 37 or the suction opening 33. Upon reaching the parking position, the shroud 84 enters into the suction opening 33 and engages with an inner circumferential surface of the suction opening 33, thereby achieving a sealing effect. However, to achieve a reliable and sufficient sealing, relatively small tolerances regarding the inner diameter of the suction opening 33 and the outer diameter of the shroud 84 are required. For this reason, the above-described sealing 34 is used in one or more embodiments. In one or more embodiments, the shroud 84 may, hence, dispense the sealing function and merely provide for centering the outlet 37 relative to the suction opening 33. For this purpose, the shroud 84 may have a tapering 85 towards the suction opening 33, whereby upon engagement of the shroud 84 in the suction opening 33 a self-centering effect is obtained.

Figure 7:
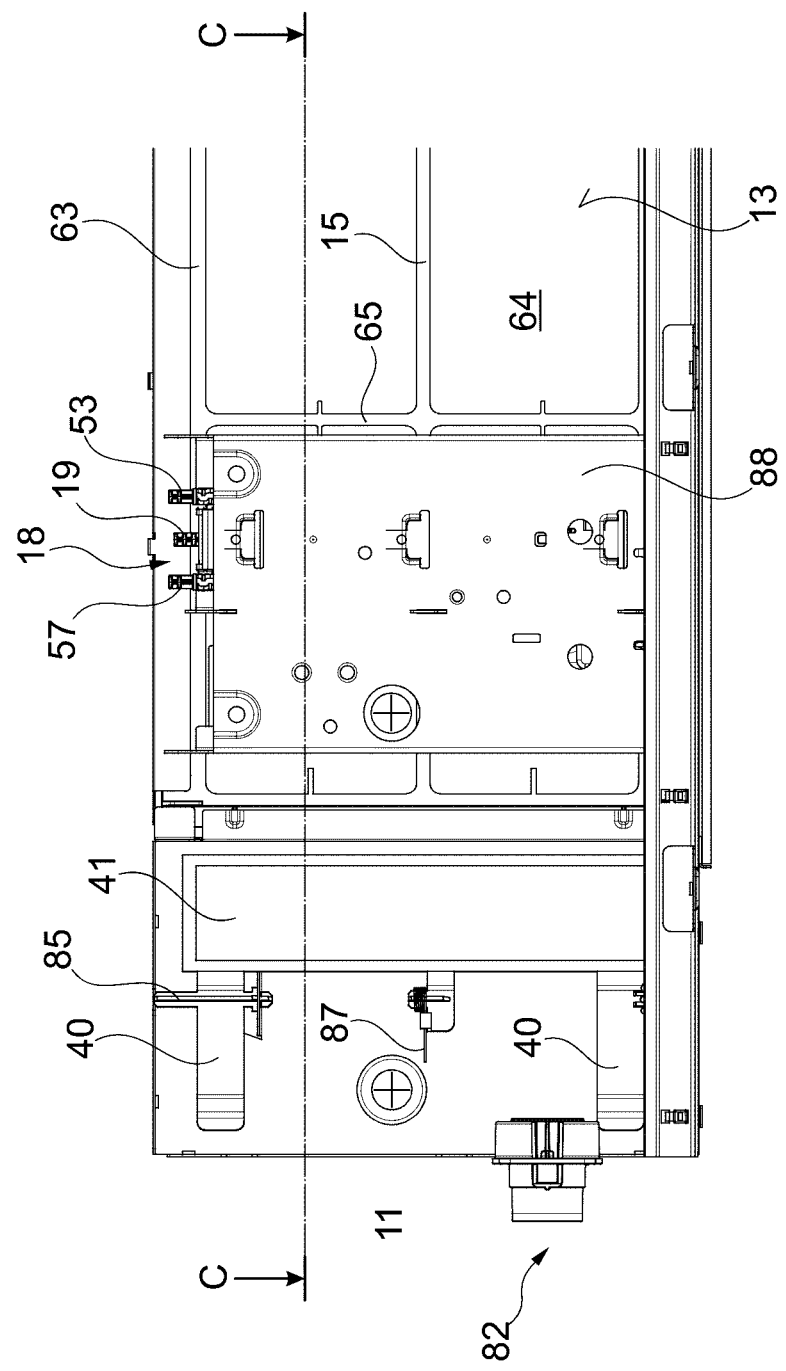
FIG. 7 shows a partial side view of the filter cleaning device shown in FIG. 2 with a front plate and other parts being removed and during filter cleaning operation.

Moreover, a lid 39 is fixed to the casing 11 as best shown in FIGS. 7 and 8. More particular, the lid 39 of one or more embodiments is rotatably fixed to the casing 11 about the rotation axis 85. In one or more embodiments, the lid 39 is comprised of a covering 86 forming a cavity 41 and an actuating arm 40. The covering 86 and the cavity 41 are located on one side relative to the axis 85 and the actuating arm 40 is located on the other side relative to the axis 85. The lid 39 is urged about the axis 85 counterclockwise by a leg spring 87 (third elastic member). In particular and with reference to the following description of its function, the lid 39 is urged towards an opening position.

When the cleaning unit is moved towards the parking position (e.g. from the position in FIG. 8 towards the left), the left end of the housing 30 or any other part of the cleaning unit comes in contact (engages) with the actuating arm 40. Accordingly, the cleaning unit pushes the actuating arm 40 in a clockwise direction about the axis 85. Thereby the covering 86 is rotated toward the housing 30 against the force of the leg spring 87. In the parking position, shown in FIGS. 5 and 6, the covering 86 closes the opening 31 of the housing 30 and the cavity 41 accommodates that portion of the brush 17 protruding from the opening 31. Lid 39 is, thus, capable of preventing any particulate matter accumulated in the dust box 28 from leaving the dust box 28 and the housing 30 during air-conditioning operation.

In this parking position also the outlet 37 and the suction opening 33 are communicated. Thus, upon plugging a fitting of a vacuum cleaner into the suction socket 42 and applying a suction force, particulate matter accommodated in the dust box 28 is sucked from the dust box 28. Further and due to the pressure reduction within the dust box 28, the covering 86 is sucked against the edge of the opening 31 of the housing. In one or more embodiments, it may, hence, well be to dispense the actuating arm 40 and to merely close the lid 39 by the suction force applied by the vacuum cleaner in the parking position. In one or more embodiments, however the opening 31 will only be closed during cleaning of the dust box 28 and the effect of preventing particulate matter from being drawn from the dust box 28 during the air conditioning operation is dispensed. Yet, closing of the opening 31 by the lid 39 also provides for a more effective cleaning of the dust box 28 as compared to a non-sealed opening. In particular, a higher under pressure may be built up within the dust box 28 leading to a more effective or more complete cleaning of the dust box 28 by the vacuum cleaner.

Figure 10:
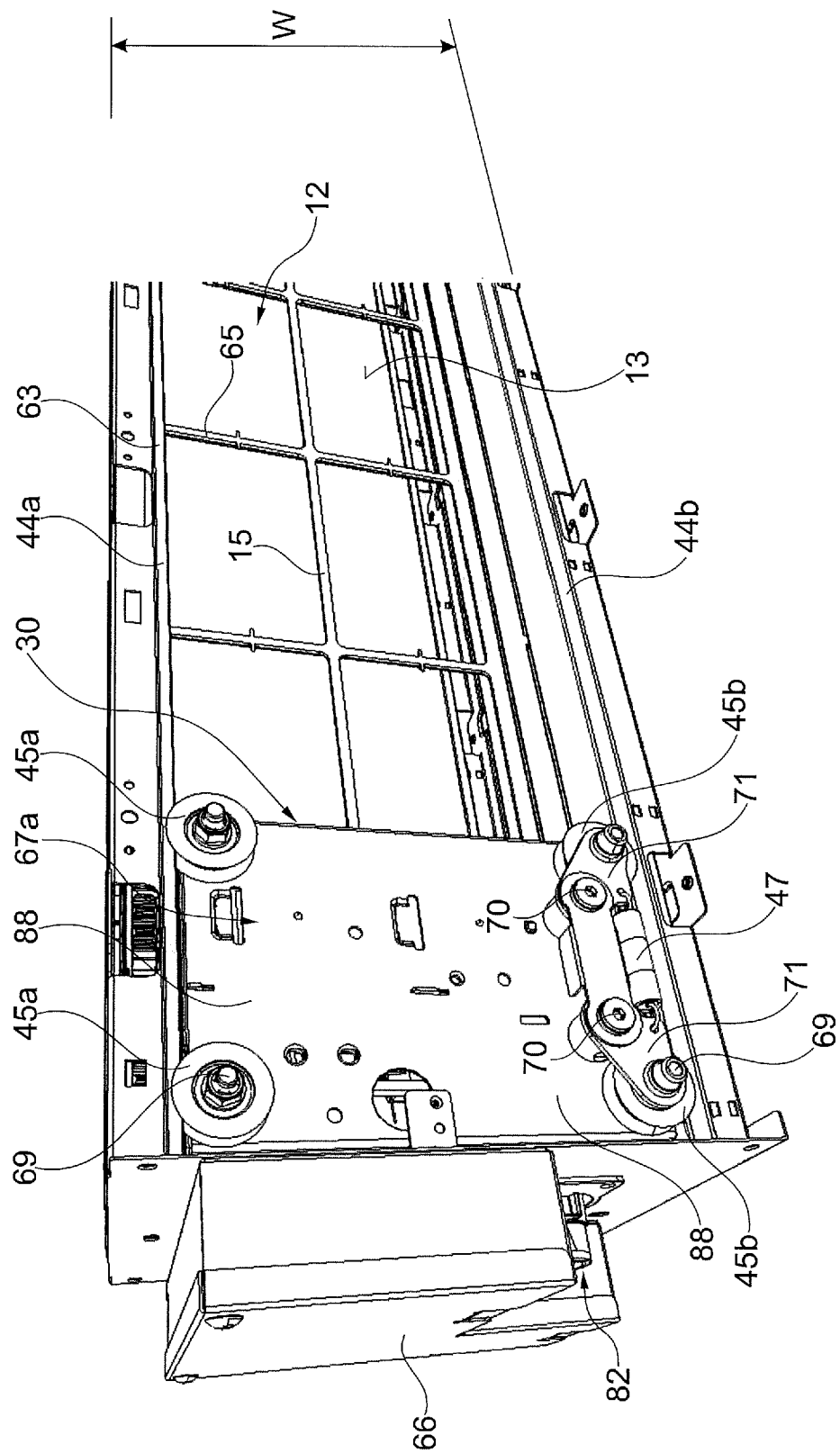
FIG. 10 shows a partial isometric front view of the filter cleaning device shown in FIG. 2 with the front plate being removed.
Figure 11:
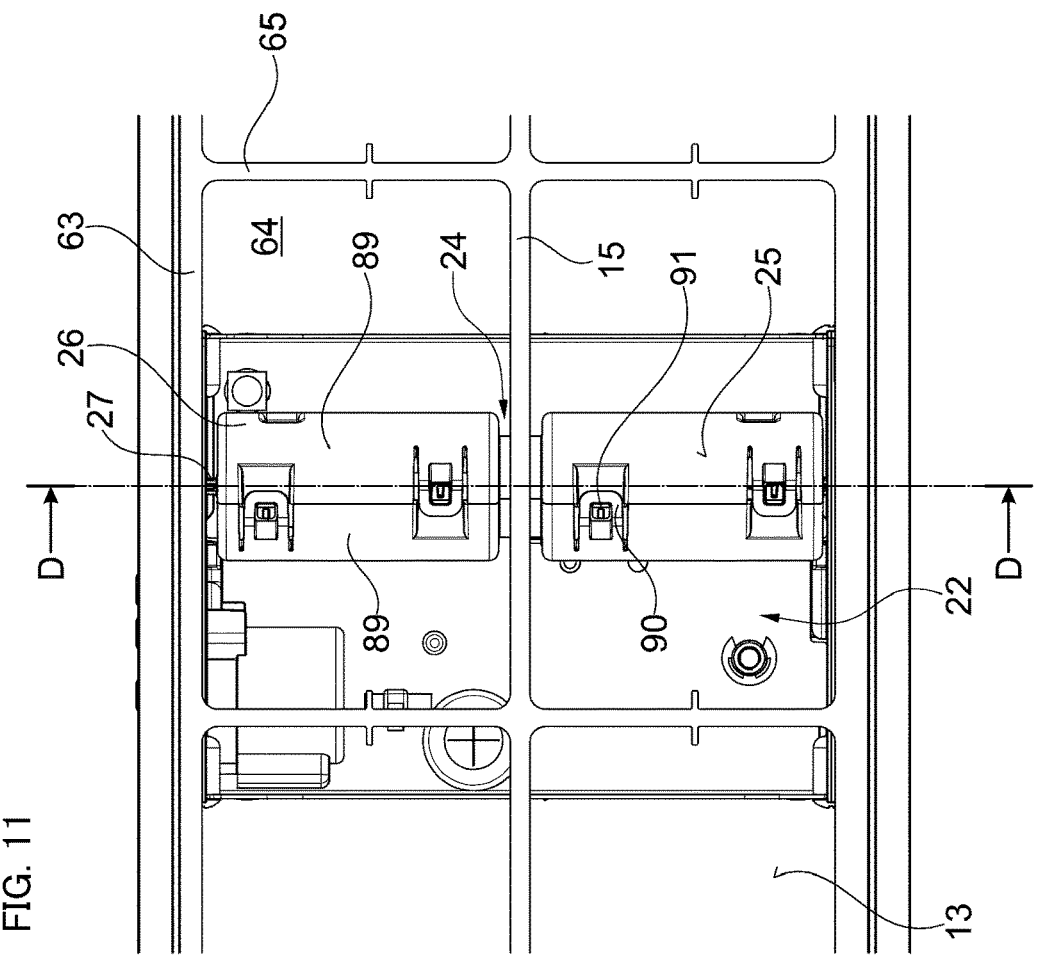
FIG. 11 shows a partial front view of the filter cleaning device shown in FIG. 2 with the brush and its supports as well as the casing being removed.

The cleaning unit further comprises the counter surface unit 67b. The counter surface unit 67b comprises a counter surface (see FIGS. 11 and 12). In one or more embodiments, the counter surface 22 is formed by the outer surface 25 of a cylinder 26. The cylinder 26 is rotatably supported in a supporting unit formed by an upper support 43c and a lower support 43d connected by a back wall 88. The support unit is configured very similar to that of the cleaning member unit 67a and comprises two upper wheels 45c and to lower wheels 45d wherein the wheels 45c, 45d and their connection are embodied in the same manner as described with respect to the cleaning member unit 67a and as shown in FIG. 10. Accordingly and in order to avoid repetition these elements are not described in more detail at this stage. Similar, motor 46 is also provided in the support unit (FIG. 11). The motor 46 is with its axis connected to eighth gear 94 meshing with a ninth gear 95 again meshing with a tenth gear 96 meshing with the rack 72. Thus, the support unit of the counter surface unit 67b is moved along the rack 72 upon operation of the motor 46 in the same manner as the support unit of the cleaning member unit 67a and further description is omitted.

The cylinder 26 comprises a cylinder axis 27 which is at the same time the axis of rotation of the cylinder 26. The cylinder 26 has at its center in the axial direction an annular groove 24. As can be best seen from FIGS. 11 and 12 the annular groove 24 accommodates the longitudinal reinforcing rib 15 of the filter 12. Thereby it can be ensured that the outer surface 25 of the cylinder reliably pushes the mesh 64 of the filter 12 against the bristles 21 of the brush 17 and closes the mesh 64 at the filter surface 14 in order to prevent particulate matter from being pressed through the mesh 64. Certainly, a plurality of such annular grooves 24 can be provided if a plurality of longitudinal reinforcing ribs 15 is provided.

In one or more embodiments, the cylinder 26 is hollow. For ease of production, the cylinder 26 can be produced from half shells 89. The half shells 89 are each half circular in cross section and, thus, a half cylindrical. The half shells may be at one end be connected by a living or integral hinge. In addition, the axis of rotation 27 may be integrally formed with one of the half shells 89. For this purpose, two coaxial protrusions may extend from the axial end of the half shells in an axial direction. Thus, the cylinder 26 may be injection molded from plastic material. To form the cylinder 26, the half shells 89 are rotated about the living hinge and fixed together by latches 90 at one of the half shells 89 and corresponding hooks 91 at the other one of the half shells 89. Certainly also other methods for fixing the half shells may be used. Also the half shells may be formed separately and then be fixed together without the use of a living hinge.

Furthermore, the filter 12 may along its length not to be completely flat but bend in a direction towards the counter surface unit 67b and/or the cleaning member unit 67a or even wavy. Accordingly, it could happen that either the brush 17 comes out of contact with the filter surface 13 reducing cleaning efficiency or that the brush 17 is pushed into the filter surface 13 to heavily with the risk of damaging the filter. For this reason, the cylinder 26 and hence the counter surface 21, formed by the outer surface 25 of the cylinder 26, is urged towards the filter surface 14.

In one or more embodiments, the axis of rotation 27 of the cylinder 26 is guided in a long hole 92 (also see FIG. 15). The longitudinal direction of the long hole 92 extends in a direction perpendicular to the filter surface 14. Accordingly, the cylinder 26 may move in a direction perpendicular to the filter surface 14. A leg spring 23 (as an example of a first elastic member) is provided in order to urge the cylinder 26 in a direction towards the filter surface 14. More particularly, the axis of rotation 27 of the cylinder 26 is rotatably fixed to a carriage 93. The carriage 93 is translationally movable in the long hole. Accordingly and even though the counter surface 22 formed by the outer surface 25 of the cylinder 26 is rigid in a radial direction, the movability of the cylinder 26 in a direction perpendicular to the filter surface 14 accommodates changes in the distance of the filter surface 14 to the outer surface 25 due to unevenness of the filter 12 along its length. Accordingly the filter is always reliably pressed against the rotating brush 17 or more particularly its bristles 21 at a relatively constant force so that a high cleaning efficiency may be achieved without the risk of damaging the filter.

In one or more embodiments, the cleaning member unit 67a and the support surface unit 67b are respectively formed independent and separate from each other. More particularly, the support units are formed separately. Accordingly, the filter cleaning device 10 may have a relatively low width (or height) being substantially dependent on the width of the filter 12. However in alternative embodiments, the support units may also be connected above and/or below the frame 63 of the filter 12. This would provide for the advantage that if and only one motor 46 would be required for both unit 67a, 67b.

In the following, the function of the above-described filter cleaning device will be explained.

In the non-cleaning operation and during air-conditioning operation, the cleaning unit including the brush 17 and the counter surface 22 is positioned in the parking position shown in FIGS. 2 to 6.

First, the control considers whether cleaning operation is required. In this context, different parameters and can trigger that cleaning operation is required. In one or more embodiments, the cleaning operation is executed in a predetermined time interval. Alternatively, a sensor may be provided capable of measuring a degree of particulate matter on the filter such as a sensor capable of measuring a flow resistance of air flowing through the filter. The output of this sensor may be used by the control to trigger the cleaning operation. Certainly, also other para meters may be used for this purpose.

Once cleaning operation is started, the control in the control box 66 cooperates with the control of the air conditioner to temporarily stop the air conditioning operation. Subsequently, the motors 46 are activated. Accordingly, the cleaning member unit 67a and the support surface unit are moved from the left to the right along the filter surfaces 13, 14 respectively, wherein the rotational force of the motors 46 is transferred via the gears 73 to 75 to the rack 72 and the gears 94 to 96 to the rack 72. At the same time the brush 17 is rotated, wherein the translational movement of the support unit of the cleaning member unit 67a along the rack 72 is converted and transmitted via the gears 76, 77 and 78 to the axis of rotation 19 of the brush 17, thereby rotating the brush 17 clockwise. Accordingly the bristles 21 brush particular matter from the filter surface 14 away from the filter surface 14 whereby the particulate matter is transferred by the brush 17 through the opening 31 into the housing 30 and subsequently falls into the dust box 28 by gravity.

In the housing 30, the particulate matter is scrapped away from the bristles 21 by the first comb shaped member 48. The first separation roller 53 being rotated by the gear 79 in a counterclockwise direction ensures that the particulate matter scrapped away from the bristles 21 by the first comb shaped member 48 is moved away from the bristles 21. The thus separated particulate matter will then fall into the dust box 28 or particularly towards its bottom 100 by gravity and will be collected at the bottom 100 of the dust box 28 (lower support 43b).

The counter surface 22 formed by the outer surface 25 of the cylinder 26 is moved together with the brush 17 along the filter 12 being in contact with the opposite filter surface 14. In particular, a line connecting the axis of rotation 27 and the axis of rotation 19 is perpendicular to the filter surfaces 13, 14. Accordingly, the counter surface 22 supports the filter 12 at the side of the filter surface 14 so as to keep the mesh 64 in contact with the bristles 21 of the brush 17. During the movement of the brush 17 and the counter surface 21 along the filter 12, the counter surface 22 may compensate for any deviations of the filter 12 from an evenly flat shape in that it may move perpendicular to the filter surfaces 13, 14 within the long hole 92. Further, as the counter surface 22 is urged towards the filter surfaces 13, 14 by the leg spring 23, the bristles 21 are engaged with the filter surface 13 at a relatively constant pressure/force along the length of the filter. Accordingly, an efficient and reliable cleaning can be executed without the risk of damaging the filter.

Further, it is to mention that the counter surface 22 particularly the cylinder 26 is not actively driven or rotated, but rotates because of its frictional contact with the filter surface 14. When the cleaning unit moves to the right, the cylinder 26 hence rotates in the same direction as the brush 17, that is clockwise. Due to the rotation of the counter surface and its curved shape, the contact area and the friction between the contact area and the filter surface 14 is relatively low so that any damaging of the filter 12 by the counter surface 22 can reliably be prevented.

Once the cleaning unit has reached the end of the filter 12 opposite to the parking position, the rotation direction of the motors 46 is switched. This can for example be triggered by the cleaning unit moving against a limit switch, thereby switching the motors 46. Yet, also other control mechanisms are conceivable. Switching the rotational direction of the motors 46 changes the rotational direction of all gears 33 to and 94 to 96. Accordingly, the brush 17 is rotated counterclockwise as are the separation rollers 53 and 54. During the movement to the left, the cylinder 26 is again rotated by frictional engagement with the filter surface 14, however, now counterclockwise. During movement in this direction, the second comb shaped member 49 and the second separation roller 54 are active for scrapping the particulate matter from the bristles 21 and move the scrapped of particulate matter away from the bristles 21 for being collected in the dust box 28.

The above process may be repeated as required until the cleaning operation is finished. If a command has been provided by the control in the control box 66 that the cleaning operation can be terminated, the cleaning unit is again moved to the parking position. During this movement and as previously indicated, the housing 30 of the cleaning unit engages with/comes into contact with the actuating arm 40 thereby pivoting the lid 39 around the axis 85 in a clockwise direction, whereby the covering 86 closes the opening 31 in the housing 30. If the cleaning unit has reached the parking position which may be indicated to the control by the use of a sensor or a limit switch, the motors 46 are activated to execute at least one more step towards the parking position in order to press the sealing 34 and securely communicate the outlet 37 and the suction opening 33. Subsequently, the cleaning operation is finished.

The cleaning personal in the premises in which the filter cleaning devices are mounted may in a regular interval then plug a fitting of the vacuum cleaner into the suction socket 42 and thereby apply a sucking force to the suction opening 33, whereby particulate matter accumulated at the bottom 100 of the dust box 28 is sucked from the dust box 28 via the cleaning opening 81, the cleaning path 80, the outlet 37, the suction opening 33, the exhaust opening 82, the hose 83 and the suction socket 42 into the vacuum cleaner. According to one or more embodiments, it may be conceivable to connect the control in the control box 66 to a network within the premises and to output a signal that the cleaning operation has been executed to the network so as to indicate to the cleaning personal that the dust box 28 is to be emptied. It is also possible to provide a visual indicator such as a light at the suction section 42, which could indicate to the cleaning personal that emptying the dust box 28 is required (for example a red light for cleaning and a green light for non-cleaning requirement). Instead of using a predetermined interval as requirement for removing the particulate matter from the dust box 28 or triggering the necessity to empty the dust box 28 by the termination of the cleaning operation, sensors outputting information on the amount of particulate matter accumulated in the dust box 28 can be used. This information can be outputted to the network or used to control the visual indicator. In one or more embodiments, the suction section 42 is disposed outside the space to be conditioned, whereby the cleaning personal does not need to enter this space for emptying the dust box 28.

As will be apparent from the above description, the filter cleaning device described above provides for a very efficient system.

Although the disclosure has been described with respect to only a limited number of embodiments, those skill in the art, having benefit of this disclosure, will appreciate that various other embodiments may be devised without departing from the scope of the present invention. Accordingly, the scope of the invention should be limited only by the attached claims.

REFERENCE SIGNS LIST

1: Air conditioner
2: Inlet
3: Outlet
4: Heat exchanger
5: Fan
6, 7: Air ducting
8: Exit grating
9: Inlet grating
10: Filter cleaning device
11: Casing
12: Filter
13, 14: Filter surface
W: Width of the filter
L: Length of the filter
15: Longitudinal reinforcing rib
16: Cleaning member (cleaning brush)
17: Brush
18: Axial end of the brush
19: Axis of rotation (cylinder axis)
20: Body
21: Bristles
22: Counter surface
23: First elastic member
24: Annular groove
25: Outer surface
26: Cylinder
27: Axis
28: Dust box
29: Direction of movement
30: Housing
31: Opening
32: Suction section (suction tool)
33: Suction opening
34: Sealing
35: Area surrounding the outlet
36: Area surrounding the suction opening of the casing
37: Outlet
38: Center axis
39: Lid
40: Actuating arm
41: Cavity
42: Suction socket
43a-d: Support
44a-d: Guide
45a-d: Wheel
46: Motor
47: Second elastic member
48: First comb shaped member
49: Second comb shaped member
LD: Length direction
WD: Width direction
50: First tangent
51: Second tangent
52: Circle
$\alpha^+$: Positive angle
$\alpha^-$: Negative angle
53: First separation roller
54: Second separation roller
60: Casing inlet
61: Casing outlet
62: Flange
63: Frame
64: Mesh
65: Transverse reinforcing rib
66: Control box
67a-b: Cleaning unit
68: Partition
69: Axis of rotation
70: Pivot
71: Pivot arm
72: Rack
73: first gear
74: second gear
75: third gear
76: fourth gear
77: fifth gear
78: sixth gear
79: seventh gear
80: Cleaning path
81: Cleaning opening
82: Exhaust opening
83: Hose
84: Shroud
85: Rotation axis
86: Covering
87: third elastic member
88: Back wall 89: Half shells
90: Latch
91: Hook
92: Long hole
93: Carriage
94: eighth gear
95: ninth gear
96: tenth gear
97: Comb body
98: Collar
99: Free edge
100: Bottom
101: Side walls
102: Teeth
103: Axis of symmetry

The invention claimed is:

1. A filter cleaning device for an air conditioner, comprising:
- a casing;
- a filter that is disposed in the casing and through which air flow passes, the filter having a filter surface;
- a cleaning brush that is contactable with the filter surface and removes particulate matter from the filter surface;
- a dust box that:
  - is movable along the filter surface,
  - receives the particulate matter,
  - accommodates the cleaning brush, and
  - has a first opening and a second opening, wherein the first opening is configured to allow the cleaning brush to protrude to contact the filter surface;
- a suction tool that comprises an outlet that communicates with the dust box, wherein the suction tool applies a suction force through the second opening to the dust box to remove the particulate matter from the dust box; and
- a lid that is fixed to the casing and movable between a first position and a second position, and that closes the first opening in the second position when the suction force is applied.

2. The filter cleaning device according to claim 1, wherein the lid moves into the second position when the dust box is in a parking position.

3. The filter cleaning device according to claim 2, wherein the suction tool further comprises:
- a suction opening, and
- the outlet is connectable to the suction opening upon movement of the dust box into the parking position.

4. The filter cleaning device according to claim 3, wherein the outlet has a center axis substantially parallel to a direction of the movement of the dust box.

5. The filter cleaning device according to claim 3, further comprising:
- a sealing sandwiched between an area surrounding the outlet and an area surrounding the suction opening when the outlet and the suction opening are connected, the sealing being pressed by a housing of the dust box moving in the direction towards the suction opening.

6. The filter cleaning device according to claim 2, wherein the dust box is disposed outside the filter surface when the dust box is in the parking position.

7. The filter cleaning device according to claim 2, wherein the lid is moveably fixed relative to the casing and comprises an actuating arm that engages with the dust box upon movement of the dust box in the direction into the parking position to move the lid from the first position into the second position.

8. The filter cleaning device according to claim 1, wherein the lid is movable into the second position by the suction force.

9. The filter cleaning device according to claim 1, wherein the lid is rotatably fixed relative to the casing to be rotatable between the first and second positions.

10. The filter cleaning device according to claim 1, wherein the lid is biased in the direction into the first position.

11. The filter cleaning device according to claim 1, wherein the lid defines a cavity that accommodates part of the cleaning brush protruding through the first opening from the dust box when the lid is in the second position.

12. An air conditioner comprising the filter cleaning device according to claim 1.

13. The air conditioner according to claim 12, wherein the dust box is moveable along the filter surface and the lid moves into the second position when the dust box is in a parking position,
the suction tool further comprises:
- a suction opening,
the outlet is connectable to the suction opening upon movement of the dust box into the parking position, and
the air conditioner further comprises:
- a suction socket that is fluidly connected to the suction opening and that receives a hose of a vacuum cleaner providing the suction force and removing the particulate matter from the dust box.

* * * * *